United States Patent [19]

Matsumura et al.

[11] E Re. 30,614

[45] Reissued May 19, 1981

[54] SIMULTANEOUS MULTIPLE TWISTING APPARATUS

[76] Inventors: Sakujiro Matsumura; Tadashi Yamamura, both of 3, Shinmeiji, Kamiyada-cho, Nishio-shi, Aichi-ken; Akira Ogura, 3-49, Shinsakae-machi, Toyokawa-shi, Aichi-ken; Masataka Hayashi, 3, Shinmeiji, Kamiyada-cho, Nishio-shi, Aichi-ken, all of Japan

[21] Appl. No.: 33,018

[22] Filed: Apr. 24, 1979

Related U.S. Patent Documents

Reissue of:

[64] Patent No.: 3,918,245
Issued: Nov. 11, 1975
Appl. No.: 505,000
Filed: Sep. 11, 1974

U.S. Applications:

[63] Continuation-in-part of Ser. No. 362,107, May 21, 1973, Pat. No. 3,846,965.

[30] Foreign Application Priority Data

May 26, 1972 [JP] Japan ..... 47-51680

[51] Int. Cl.[2] ..... D01H 1/10; D01H 1/28; D01H 7/86

[52] U.S. Cl. ..... 57/58.54; 57/58.52; 57/58.55; 57/58.86; 57/80

[58] Field of Search ..... 57/58.52, 58.54, 58.55, 57/58.65, 58.68, 58.72, 58.83, 58.86, 58.7, 80, 90, 55.5

[56] References Cited

U.S. PATENT DOCUMENTS

| | | | |
|---|---|---|---|
| Re. 24,945 | 3/1961 | Vibber . | |
| 2,576,936 | 12/1951 | Heffelfinger . | |
| 2,635,413 | 4/1953 | Truitt | 57/58.52 |
| 2,654,211 | 10/1953 | Uhlig . | |
| 2,979,882 | 4/1961 | Bromley et al. . | |
| 2,989,837 | 6/1961 | Vibber | 57/58.55 |
| 3,146,572 | 9/1964 | Keyser . | |
| 3,192,698 | 7/1965 | Vibber | 57/58.83 |

FOREIGN PATENT DOCUMENTS

| | | |
|---|---|---|
| 1822852 | 3/1960 | Fed. Rep. of Germany . |
| 1226013 | 4/1967 | Fed. Rep. of Germany . |
| 2018910 | 4/1970 | Fed. Rep. of Germany . |
| 1027270 | 2/1953 | France . |
| 399264 | 9/1965 | Switzerland . |
| 404168 | 3/1933 | United Kingdom . |
| 788242 | 12/1957 | United Kingdom . |
| 812283 | 4/1959 | United Kingdom . |

OTHER PUBLICATIONS

Melliand Textilberichte, vol. 39, No. 4 & 5, 1958.

*Primary Examiner*—Donald Watkins
*Attorney, Agent, or Firm*—Miller & Prestia

[57] ABSTRACT

In each twisting unit of a multiple twisting apparatus, a two-for-one twisting assembly imparts a first twist to each component yarn while a ring twisting assembly imparts a second twist to [a] *the* doubled first-twisted yarns. A plurality of first twisted yarns are doubled under tension control and the doubled yarn is taken up by a feed mechanism so as to be supplied to the ring twisting assembly under tension control via a yarn passage formed behind the two-for-one twisting assemblies. The two-for-one twisting assemblies are arranged in two alignments along a lengthwise direction of the apparatus.

All driving members are driven synchronously at least at a starting period and at a time of stopping the twisting operation.

45 Claims, 19 Drawing Figures

SIMULTANEOUS MULTIPLE TWISTING APPARATUS

Matter enclosed in heavy brackets [ ] appears in the original patent but forms no part of this reissue specification; matter printed in italics indicates the additions made by reissue.

SUMMARY OF THE INVENTION

The present invention is a continuation in part application of the copending U.S. Pat. application Ser. No. 362,107, *filed May 21, 1973,* now U.S. Pat. No. 3,846,965, and relates to an improved multiple twister.

In particular it relates to an improvement of a multiple twisting apparatus wherein a first twist is applied to each component yarn by a two-for-one twisting assembly while a second twist is applied to a strand of combined first-twisted component yarn by a ring twisting assembly. All driving members are driven synchronously; at least at a starting period and at a time of stopping the twisting operation.

Generally, several different types of twisting apparatus have been utilized for producing multiple plied yarns. One of them is a so-called simultaneous multiple twisting assembly which utilizes a so-called direct double twister having a flyer twisting and winding mechanism. Another known twisting apparatus is a multiple twisting assembly shown in the British Pat. No. 896,493, wherein a first twist is imparted to two component yarns by a pair of two-for-one twisting assemblies, respectively, and thereafter a second twist is imparted to a strand of combined yarns in one continuous process.

According to our experience, in the first mentioned twisting assembly, it is very difficult to control the balance of tension between component twisted yarns and, consequently, it is impossible to prevent the breakage of component yarns during the operation. The larger the size of a yarn package mounted on an inside spindle of the assembly the more pronounced the above-mentioned problem becomes. Therefore, there is a certain limitation in the size of a full packaged bobbin mounted on the inside spindle of the assembly. As doffing of the exhaust bobbins from the inside spindle and donning of the full packaged fresh bobbins on the inside spindle is often required, if the size of the above-mentioned full packaged bobbin is restricted, the productivity of the twisting assembly is also restricted.

The second type of the above-mentioned apparatus is utilized for processing orientable continuous filament yarn. This apparatus comprises, in combination, means for withdrawing the orientable yarn from a yarn package and for twisting the same so as to produce two twists for each revolution of a shaft. A first yarn forwarding device associated with the withdrawing and twisting means draws the yarn at a speed greater than the speed at which the yarn is withdrawn from the yarn package, whereby the yarn is twisted and stretched simultaneously. Means are provided for taking up the thus-processed yarn in an ordinary manner. In this apparatus, a [yarn-with-drawing] *yarn withdrawing* device is disposed in a yarn passage formed in a hollow axis of the yarn package, and this device is driven in a controlled rotational relationship with the first yarn forwarding device. As described in the specification of this prior patent, when a first twist is imparted to a yarn by the two-for-one twisting assembly, a yarn taken from the package is positively carried by a plurality of rollers so as to lead toward a rear side direction of the assembly and, after passing through a hollow shaft of a worm gear and a yarn guide, the yarn is carried to a front position of the assembly. The two processed yarns are then doubled. The doubled yarn is stretched while passing through a stretching device and finally, a second twist is imparted to this stretched yarn by a ring twisting assembly.

Based on our experience, we have found that, in the yarn processing operation using the [section] *second* type of the above-mentioned apparatus, as the orientable yarns are firstly provided with a first twist, respectively, and next, the double yarn is subjected to the stretching operation and, finally, the second twist is imparted to the stretched yarn, it is not easy to maintain the twist configurations of component yarns in a balanced condition before doubling. If an unbalanced condition is created, this unbalanced twist configuration between the component yarns creates an undesirable configuration of the second twist, such as the creation of *a* snail. The stretching operation enhances the above-mentioned objectionable features. According to our experience, if a twisted doubled yarn is subjected to a stretching operation, the twist (second twist) tends to displace toward an upstream portion of the yarn which is being carried through the yarn passage in the stretching zone. In other words, the first twisted yarn is mainly stretched in a doubled condition without twists. However, when the twists are concentrated in the above-mentioned upstream portion and the concentrated twists reach a saturated condition, the concentrated twists are displaced to a downstream portion of the yarn which is being carried through the yarn passage in the stretching zone. And when the number of twists remaining in the yarn, which is being carried through the yarn passage, is lowered to a certain limit, the above-mentioned concentration of the twists in the upstream portion of the yarn commences. The above-mentioned displacement and concentration of the twists is repeated during the operation. According to the above-mentioned displacement and concentration of the twists, the stretching of the doubled yarn can not be carried out uniformly, and, further, the distribution of twists of each component yarn becomes irregular. Consequently, it is very difficult to produce a multiple twisted yarn having uniform quality. In other words, the second-mentioned apparatus can not be utilized for producing a tire-cord yarn for vehicle tires which requires a high uniformity of twist configuration and other mechanical properties. However, the second mentioned apparatus may be utilized to produce a cord yarn for manufacturing a conveyer belt which is preferably utilized for carrying substances of light weight, because there is no danger of serious accidents causing injury to human beings, as would be the case if this cord yarn were to be used in vehicle tires.

It may be considered that the second mentioned apparatus can be utilized for producing multiple twisted yarn by omitting the stretching means. However, in this apparatus, it is difficult to maintain a balanced condition between the first twists imparted to each component yarn because of the uneven condition of the ballooning which is inevitable in the two-for-one twisting assembly of this apparatus.

The principal object of the present invention is to eliminate the above-mentioned objectionable features of the conventional apparatus, by presenting a multiple twisting apparatus whereby the first twisting operation, doubling operation and the second twisting operation can be carried out uniformly so that a high degree of uniformity in configuration of twists can be imparted to the component yarns and doubled yarn, and a muliple twisted yarn of a superior quality can be produced with high production efficiency.

A further object of the present invention is to provide a multiple twisting apparatus having superior operative functions, such as the ability of preventing the creation of slackened yarn or, preventing instant elevation of yarn tension at the time of doffing full packaged bobbins from the second twisting assemblies or during the donning of full packaged bobbins on the first twisting assemblies, or when starting the twisting operation after temporarily stopping the operation.

Still another object of the present invention is to provide a compact multiple twisting apparatus which will then reduce the required installation space.

A still further object of the present invention is to provide a multiple twisting apparatus which is easily handled so that the operation cost can be reduced.

The simultaneous mutliple twisting apparatus according to the present invention comprises at least one twisting unit provided with the following essential elements:

a. a first twisting element comprising at least two two-for-one twisting assemblies;

b. an element for combining twisting yarns delivered from the above-mentioned two-for-one twisting assemblies;

c. a second twisting element, disposed at a position below a corresponding said first twisting element for imparting a second twist to the combined yarn delivered from the combining element.

d. an element for positively carrying the combined yarn to the second twisting element;

e. a group of yarn guides for leading the combined yarn along a passage behind and then below the first twisting element, and thereafter leading the combined yarn to a position right above the second twisting element;

f. at least one driving mechanism for driving the first twisting element and carrying element and the second twisting element in tandem or separately.

In the present invention, the well known conventional two-for-one twisting assembly is capable of being utilized as the above-mentioned two-for-one twisting assembly without any modification. In the case of producing a two-ply yarn, a pair of two-for-one twisting assemblies are used as the first twisting element while in the case of producing a three-ply yarn, the number of component twisting assemblies is three. That is, the required number of component twisting assemblies for the first twisting element depends upon the number of plies of the final yarn produced by each twisting unit.

The first twisted yarns delivered from the respective two-for-one twisting assemblies are carried to the second twisting element in contact with each other or carried closely, by way of a combining element so as to form a common carrying passage. A conventional yarn guide may be utilized as the abovementioned combination element. A conventional pinch roller, which is utilized to positively carry a yarn, is preferably employed in the present invention as the above-mentioned carrying element. As for the second twisting element, the well known ring twisting assembly is successively utilized. A mechanism comprising a conventional driving motor, gear trains and belt driving means is employed in the present invention as the above-mentioned driving mechanism. Further, a method for driving each of the second twisting elements by an individual driving motor is also applicable in the present invention.

It is well known that the conventional two-for-one twisting assembly is provided with a tension control means disposed therein. This tension control means is hereinafter referred to as a first tension control element. The simultaneous multiple twisting apparatus according to the present invention is further provided with tension control means comprising a second tension control element, disposed at a position along a yarn passage between the delivery part of each two-for-one twisting assembly and the above-mentioned combining element, and a third tension control element, disposed at a position which is adjacent to and downstream of the yarn passage to the combining element.

Further, in the present invention, the first twisting element and the carrying element are synchronously driven with the second twisting element at the period of commencing the twisting operation, and at a time of stopping the operation. In the present invention, to attain easy handling of the yarn bobbins mounted in the first twisting element, a spindle axis of each of the two-for-one twisting assemblies of the first twisting element is disposed on the machine frame with an angle $\theta$ between the upright direction and the spindle axis. This angle $\theta$ is in a range between 0° and 90°, preferably in a range between 0° and 45°.

In the twisting apparatus according to the present invention, there [are] *is* provided at least one twisting unit, but usually more than 20 twisting units, and the two-for-one twisting assemblies of each twisting unit are arranged in a front side and a rear side alignment. Therefore, it is essential to arrange these twisting assemblies in a balanced relation. Consequently, in the present invention, the twisting assemblies of each first twisting element are positioned in such a condition that an angle between a line passing through the centers of the spindle shafts of the front side and rear side twisting assemblies and the direction of the front side or rear side alignment is in a range between 30° and 90°.

To carry out the twisting operation under stable conditions, it is essential to control the yarn tension in each twisting device. Therefore, in the present invention, each first twisting device is provided with a tension control mechanism, and the tensions of the twisted component yarns taken from the respective yarn packages are controlled before doubling and, in addition, the yarn tension of the doubled yarn is also controlled. These tensions are required to satisfy a particular relation $T_1<T_2<T_3$, where $T_1$, $T_2$ and $T_3$ represent the yarn tension controlled by the above-mentioned tension controls, respectively. That is, $T_1$ represents a yarn tension in the first twisting device, $T_2$, a yarn tension just before doubling and $T_3$, a yarn tension of one of the doubled yarns. In the above mentioned arrangement of the first twisting device yarn passage, a synchronous driving mechanism and tension control, the purpose of the present invention can be satisfactorily attained.

Further features and advantages of the present invention will be apparent from the ensuing description with reference to the accompanying drawings to which the scope of the invention is in no way limited.

DETAILED EXPLANATION OF THE INVENTION

Figure 1:
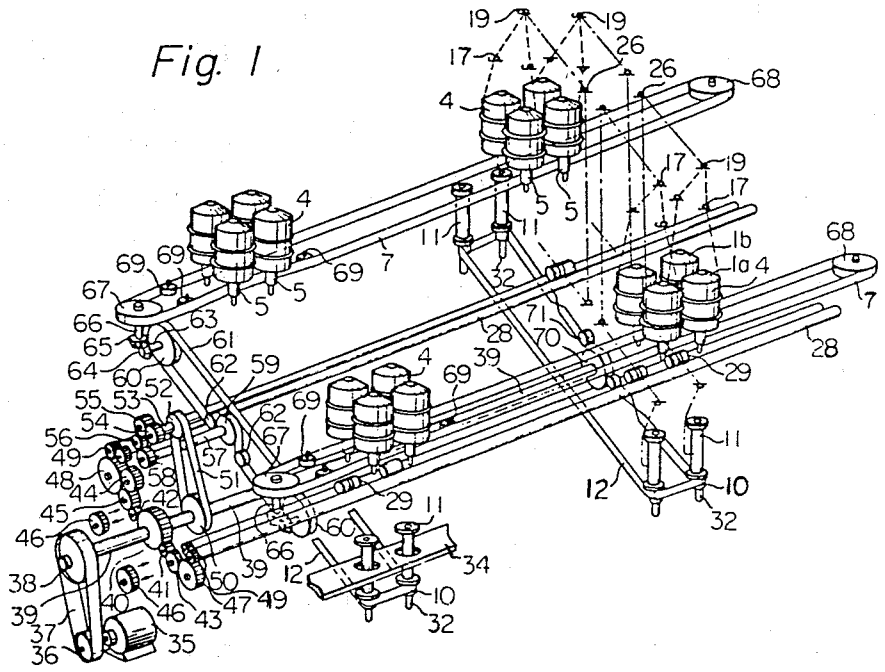
FIG. 1 is a partial perspective view of an embodiment of the multiple twisting apparatus, according to the present invention.
Figure 2:
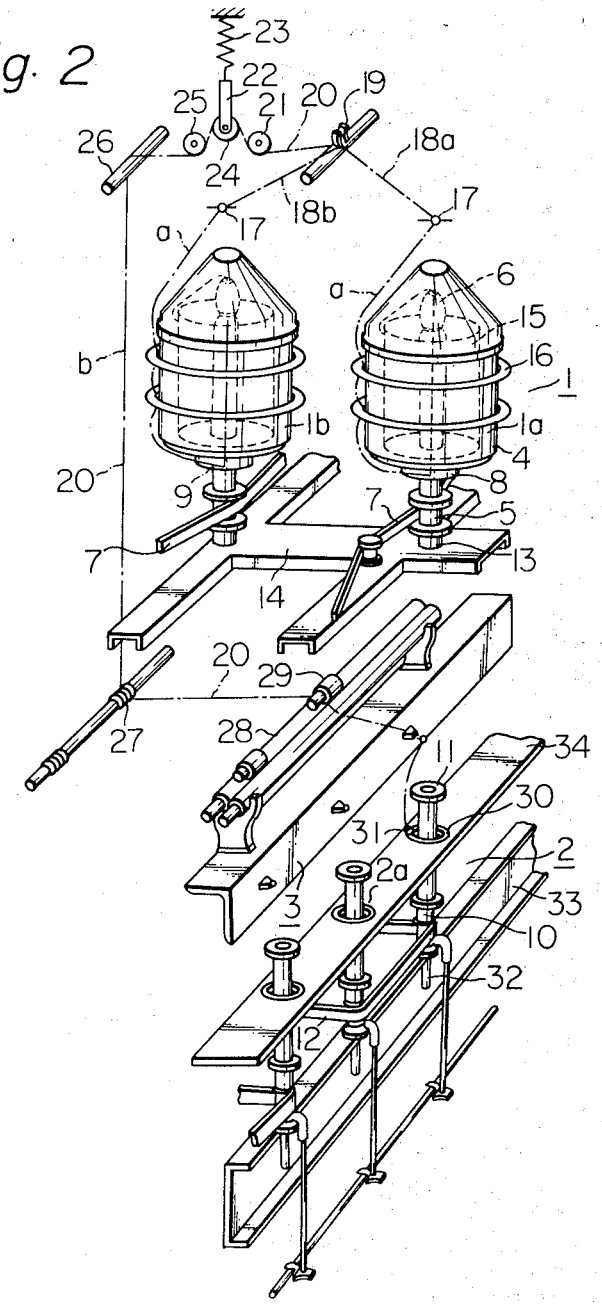
FIG. 2 is a schematic perspective view of a unit of the twisting assembly shown in FIG. 1.

Referring to FIGS. 1 and 2 in an embodiment of the multiple twisting apparatus according to the present invention, a plurality of twisting units are arranged along the lengthwise direction of the apparatus and at both sides thereof. Each twisting unit comprising a first twisting device 1 and a second twisting device 2 disposed below the first twisting device 1. The first twisting device 1 comprises a pair of two-for-one twisting assemblies 1a and 1b, the second twisting device 2 comprises a ring twisting assembly 2a, and the first twisting device 1 and second twisting device 2 are synchronously driven by a synchronous driving mechanism which will be hereinafter explained in detail. The two-for-one twisting assembly is utilized as one component of the twisting assemblies of a first twisting device 1. Each two-for-one twisting assembly 1a, or 1b is provided with a housing or balloon guide bucket 4 and a spindle 5 which is driven by an endless belt 7 and a rotating disc 8. In each ring twisting assembly 2a utilized as a second twisting device 2, a bobbin 11 is mounted on a spindle 10 which is driven by an endless belt 12. The two-for-one twisting assemblies 1a; 1b are arranged in a side by side relation and their spindles 5 are rotatably supported by a pair of bearings 13 in an upright condition. The bearings 13 are rigidly mounted on a top spindle rail 14 in such a way that they are aligned along a line which is substantially perpendicular to a lengthwise direction of the top spindle rail 14. As shown in FIG. 1, a plurality of twisting units are arranged on both sides of the multiple twisting apparatus along the lengthwise direction thereof. As the first twisting device of each unit comprises a pair of two-for-one twisting assemblies 1a, 1b arranged as mentioned above, in each side of the multiple twisting apparatus shown in FIG. 1, there are two alignments of two-for-one twisting assemblies; that is, in a twisting unit, a two-for-one twisting assembly 1a is located on a front side alignment and the other two-for-one twisting assembly 1b is located on a rear side alignment facing the above-mentioned two-for-one twisting assembly 1a of the front side alignment, and a second twisting device 2 disposed below the above-mentioned first twisting device 1.

In this embodiment, the bearing 13 is aligned along a line which is perpendicular to the lengthwise direction of the top spindle rail 14. However, it is also practical to dispose the bearing 13 along a line which is a little inclined from a line perpendicular to the lengthwise direction of the top spindle rail 14.

In the two-for-one twisting assembly 1a, 1b a yarn is withdrawn from the package 15 mounted on the spindle 5 and led into a yarn passage formed in the spindle 5 by way of a top aperture 6 of the spindle 5 and delivered from an outlet aperture 9 formed on the rotating disc 8 and taken up toward a yarn guide 17.

Figure 3:
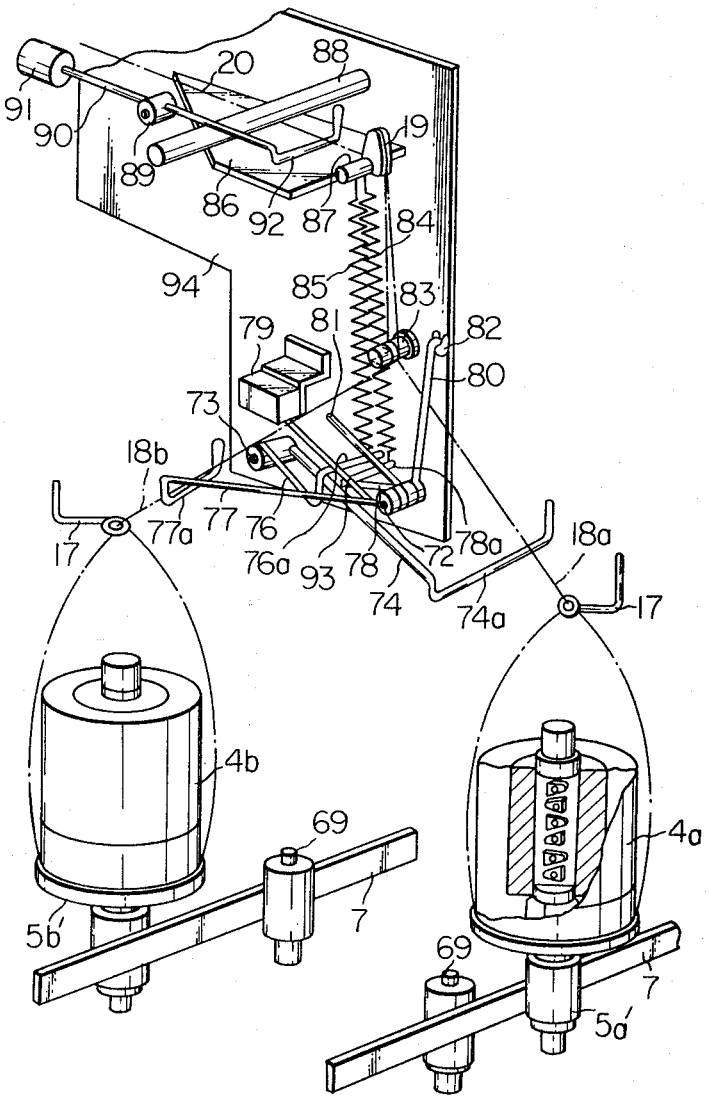
FIGS. 3 and 4 are a perspective view and a side view respectively, of another embodiment having a special tension control mechanism according to the present invention.

The yarn passing through a yarn passage a between the outlet aperture 9 and the yarn guide 17 has a tendency to make a balloon about the housing 4. To control this balloon, a pair of balloon control rings 16 are mounted on the two-for-one twisting assembly 1. When the yarn is carried through the yarn passage formed inside the spindle 5, the yarn tension is controlled by a conventional tension control means as shown in FIG. 3. This controlled yarn tension is hereinafter referred to as a tension $T_1$, and the yarn tension in the yarn passage a is hereinafter referred to as a tension $T_2$. As it is well known from many prior art patents, such as British Pat. No. 896,493, a first twist is imparted to a yarn taken from a package 15 until the yarn arrives at the yarn guide 17. Duplicate twists are imparted to the yarn withdrawn from the package 15 at each one revolution of the spindle 5.

The first twisted yarns 18a, 18b are then doubled by a thread guide 19 and a strand *or strands* of doubled yarn 20 [is] *is/are* carried to the second twisting device 2 that is, the ring twisting assembly 2a, by way of a yarn passage b formed behind the back two-for-one twisting assembly 1. This yarn passage b is defined by a thread guide 26, and a bottom thread guide 27. The doubled yarn 20 is then taken up by a feed mechanism comprising a pair of bottom rollers 28, which are positively driven, and a top roller 29 rotatably mounted on the bottom rollers 28. The feed mechanism is mounted on a horizontal machine frame 3. The doubled yarn 20 delivered from the feed mechanism is then wound on a bobbin 11 while imparting the second twist by this ring twisting assembly 2a. In FIG. 2, a ring and a traveller are represented by reference numerals 30 and 31, respectively. In this embodiment, each spindle 10 of the ring twisting assembly 2a is rotatably supported by a spindle bolster 32 which is mounted on a bottom spindle rail 33 at a position corresponding to the first twisting device 1 of the unit. The ring 30 is also rigidly mounted on a conventional ring rail 34.

In the above-mentioned embodiment, it is very important to maintain a balanced condition between the yarn tensions $T_2$ of two component yarns supplied from the front and back two-for-one twisting assemblies 1a, 1b. To attain this purpose, a tension control device is disposed along the yarn passages at an adjacently downstream position to the thread guide 17. The detailed mechanism of this control device is hereinafter explained with reference to the drawings of FIGS. 3 and 4.

According to our practical tests of the process certain unbalanced conditions in yarn tension were observed when the doffing, donning operations were carried out in the first and second twisting devices 1 and 2. Consequently, in the present invention, a reserve mechanism for controlling the yarn tension is disposed along a yarn passage between the thread guide 19 and 26. This reserve mechanism comprises a pair of guide rollers 21 and 25 which are rotatably supported at stationary positions by brackets (not shown) and an intermediate guide roller 24 which is rotatably supported by a supporting member 22. The supporting member 22 is always biased upward by a tension spring 23 secured at one end to a machine frame (not shown). As the supporting member 22 is capable of being displaced upward by the biasing force of the tension spring 23 and the doubled yarn 20 passes the guide rollers 21, 24, as 25 as shown in FIG. 2, if the tension of the doubled yarn 20 is lowered, in other words, if the doubled yarn 20 becomes slack, the guide roller 24 is displaced upward, so that the slack portion of the doubled yarn 20 is reserved in the mechanism, and if the tension of the doubled yarn 20 is increased, the guide roller 24 is pulled downward so that the tension can be compensated. The above-mentioned controlled tension of the doubled yarn 20 is hereinafter referred to as tension $T_3$.

According to our practice processing test, it is very important to maintain the balanced condition between tensions $T_1$, $T_2$ and $T_3$. That is, it is required to satisfy the following relationships, $T_3>T_2>T_1$.

The preferable value of the tensions $T_1$, $T_2$ and $T_3$ are defined as follows: $T_1$ is controlled within the range of 0.005 g/denier to 0.050 g/denier; $T_2$ is controlled within the range of 0.035 g/denier to 0.150 g/denier, and; $T_3$ is controlled within the range of 0.070 g/denier to 0.200 g/denier. The tensions $T_1$, $T_2$ and $T_3$, however, have a relationship of: $T_2$ is larger than $T_1$, and $T_3$ is larger than $T_2$; that is, $T_1<T_2<T_3$. Particularly, $T_2$ is defined in a range of from 2 to 10 times $T_1$, and $T_3$ is defined in a range from 1.1 to 4 times $T_2$.

For the purpose of establishing better operating conditions, it is desirable to apply a tension control mechanism by which the above-mentioned yarn tension can be controlled as follows. If the starting and stopping of the first twisting device are operated synchronously with the second twisting device.

$$T_1>K$$

$$T_3=T_2+R_2$$

where,

K represents a frictional force of the yarn with yarn guides 83, 19 which are shown in FIG. 3;

$R_2$ represents a force creating a torsion kinky thread in a yarn passage between an aperture 9 and the guide 83.

Otherwise, yarn in any portion of the yarn passage from the package 15 to the feeding mechanism tends to slacken and, consequently, it becomes impossible to impart a balanced twist to the component yarns.

Figure 4:
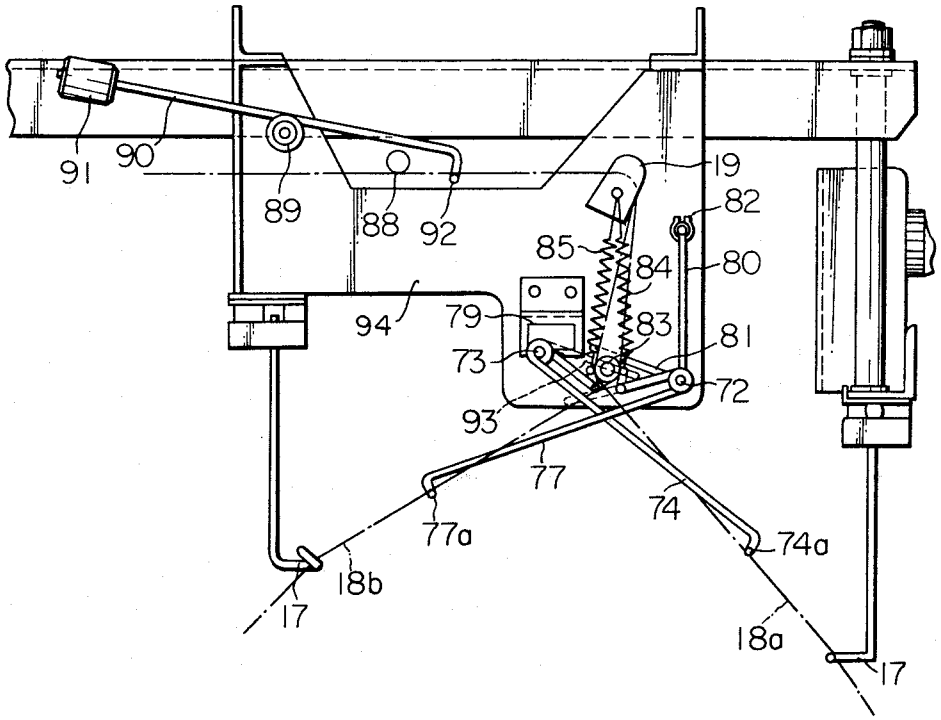

The tension control means for controlling the yarn tension $T_2$ is hereinafter explained in detail. Referring to FIGS. 3 and 4, the tension $T_2$ is controlled by a tension spring. An intermediate yarn guide 83 is secured to a bracket 94. The tension control mechanism for controlling the yarn tension $T_2$ comprises a pair of feelers 74, 77 supported by pins 72, 73, respectively. These pins 72, 73 are turnably mounted on the bracket 94. The feeler 74 is provided with a free end portion 74a curved so as to cross a yarn passage between the yarn guide 17 and the yarn guide 83. An additional rod 76 provided with a free horizontal end portion 76a is secured to the pin 73. The feeler 77 is provided with a similar free end portion 77a which crosses another yarn passage between another yarn guide 17 and guide 83. An additional rod 78 provided with a free horizontal end portion 78a is secured to the pin 72. A horizontal supporting plate 86 projects from the bracket 94 and a spring holder 87 is secured to the bracket 94. The thread guide 19 is also secured to the bracket 94. A tension spring 84 connects the horizontal end portion 78a of the rod 78 and the spring holder 87, while another tension spring 85 connects the horizontal end portion 76a of the rod 76. Consequently, the feelers 74, 77 are always provided with turning forces so as to bias their free end portions 74a, 77a upwards. In other words, the yarn tension $T_2$ of the first twisted yarn 18a, or 18b can be maintained in a balanced condition by the pulling force created by the respective tension spring 84, 85. The first twisted yarns 18a, 18b are carried to the thread guide 19 so as to double them and the double yarn 20 is carried to the thread guide 26 (FIG. 2).

In this embodiment, a modified yarn reserve mechanism is utilized instead of the mechanism shown in FIG. 2, and a so-called cantilever principle is applied. In the yarn reserve mechanism shown in FIGS. 3 and 4, a cantilever type rod 90 is secured to a turnable pin 89 which is turnably mounted to the bracket 94. A counter weight 91 is adjustably mounted on a free end portion of the rod 90 while another free end portion thereof is formed as a curved portion 92 which crosses the yarn passage between the thread guide 19 and 26. A horizontal bar 88 is secured to the bracket 94 in such a way that the doubled yarn 20 passes proximately below the bar 88. Therefore, by fixing the counter weight 91 at a suitable position on the rod 90, the curved portion 92 of the rod 90 urges the doubled yarn 20 upward so that the tension $T_3$ can be maintained in a balanced condition by the turning force of the rod 90 about the pin 89. And, even if the doubled yarn 20 is slackened by a stop of the twisting operation, the slackened yarn portion can be reserved in the passage between the thread guides 19 and 26 by forming a reserved loop between the horizontal bar 88 and the thread guide 19 while maintaining desirable yarn tensions $T_2$ and $T_3$. In this embodiment, the above-mentioned feelers 74, 77 can be used as a means for detecting yarn breaks and stopping the operation of the twisting assembly. Referring to FIGS. 3 and 4, a limit switch 79 is mounted on the bracket 94 in such a way that a detecting rod 93 of the limit switch 79 is position above the horizontal end portions 76a and 78a of the rods 76, and 79. Therefore, when one of the first twisted yarns 18a, 18b is broken, one of the feelers 74, 77 is turned, and then one of the horizontal end portions 76a, 78a, urges the rod 93 upward. According to the above-mentioned motion, the limit switch 79 is actuated so as to stop the driving of the apparatus. As the stop mechanism whichiis actuated by a limit switch is well known in the art, the explanation of the detailed mechanism of the stop means is omitted here. However, in this embodiment, if it is necessary to stop the twisting operation of a twisting unit for some reason such as piecing broken yarn ends, the yarn tension of the yarns 18a, 18b are lowered so that the feelers 74, 77 are turned and the horizontal end portions 76a, 78a, actuate to turn the rod 93 upward. In such a condition, the twisting unit can not commence driving. To avoid such an unnecessary situation, a lever 80 is turnably mounted on the pin 72. The lever 80 is provided with a free portion 81 extending toward the limit switch 79 in such a way that the free portion 81 extends adjacently over the horizontal end portions 76a, 78a, of the rods 76, 78 respectively. Another end of the lever 80 is capable of engaging with a rest member 82 secured to the bracket 94. When the end of the lever 80 engages with the rest member 82, the free portion 81 is positioned at a free position above the horizontal end portions 76a, 78a of the rods 76, 78, and; when it is necessary to prevent the actuation of the limit switch 79, the end of the lever 80 is disengaged from the rest member 82 and turned counterclockwise about the pin 72 so that the free end portion 81 prevents the actuation of the horizontal rods 76a, 78a against the rod 93 of the limit switch 79.

As already set forth, to prevent the above-mentioned undesirable condition of yarn tension, it is essential to drive the first twisting device 1 in synchronous condition with the second twisting device 2 during at least a period of starting the twisting operation and at a time of stopping the twisting operation.

To attain the above-mentioned desirable driving condition, the endless belt 7 and endless belt 12 are driven by a common driving source as shown in FIG. 1. Referring to FIG. 1, a pulley 36 is secured to a motor shaft of a common driving motor 35.

A main shaft 39 extending lengthwise along a machine frame is provided with a pulley 38 rigidly mounted on a free outside end portion thereof. The pulley 38 is driven by the pulley 36 by way of an endless belt 37. A pulley 50 is rigidly mounted on the shaft 39 and drives a pulley 52 rigidly mounted on a shaft 53 by way of an endless belt 51. A small gear 54 is rigidly mounted on the shaft 53. A small gear 58 mounted on a horizontal shaft 57 is driven by a gear train comprising gears 55 and 56 by meshing the gear 55 with the gear 54. Pulleys 67 are secured to the shafts 66 which are rotatably supported by respective brackets (not shown) secured to the machine frame at both sides of the machine. Each upright shaft 66 is provided with a driving pulley 67 at the top end portion thereof, while a bevel gear 65 is secured to a bottom end portion thereof. Each bevel gear 65 meshes with a bevel gear 64 rigidly mounted on a horizontal shaft 63. A pulley 60 is secured to each shaft 63. Consequently, it must be understood that the two pulleys 60 are disposed at corresponding positions adjacent to the upright shafts 66, respectively. These pulleys 60 are driven by the pulley 59 by way of an endless belt 61. In this driving mechanism shown in FIG. 1, tension guide pulleys are designated by 62. At another end of the machine frame, a pair of pulleys 68 are rotatably mounted. A pair of endless belts 7 are mounted on the pairs of pulleys 67 and 68 so that each endless belt 7 is driven by the rotation of the driving pulley 67. To ensure sufficient contact between thb belt 7 and the spindle 5, a plurality of tension guide rollers 69 are mounted on the machine frame as shown in FIG. 1. On the other hand, a plurality of driving pulleys 70 are rigidly mounted on the main shaft 39 at appropriate positions to drive each corresponding group of spindles 10. Each endless belt 12 is mounted on the driving pulley 70 and spindle wharves of four spindles 10 so as to drive spindles 10. A plurality of tension guide rollers 71 are mounted on the main frame so as to prevent slippage of the endless belt 12 on these [pulley] *pulleys* 70 and spindle wharves. A main gear 40 is rigidly mounted on the shaft 39 at the gear end portion of the machine. Each pair of feeding rollers 28 are provided with small gears 49 mounted on the respective gear end portions thereof. The front side small gears 49 are driven by way of a gear train comprising intermediate gears 41, 43 and 47 by meshing the gear 41 with the main gear 40. On the other hand, the rear side small gears 49 are driven by way of a gear train comprising intermediate gears 42, 44, 45 and 48 by meshing the gear 42 with the main gear 40. Further, the gear 45 is capable of engaging or disengaging from the gears 42 and 44, and when the gear 45 is disengaged from the gears 42 and 44, the gears 42 and 44 are able to connect directly to each other. The other gear 46 is additionally provided as a spare gear. If it is required to change the direction of the first and second twist the gear 46 is inserted into the gearing composed of the gears 41 and 43, so as to be able to transmit the driving power of the gear 41 to the gear 43, and then the motor 35 is driven in the reverse rotational direction to the above-mentioned normal driving condition. As the spindles 5 of the first twisting device 1, the spindles 10 of the second twisting device 2 and the bottom rollers 28 are all driven by a common drive motor 35 as mentioned above, the first twisting operation and second twisting operation of each twisting unit can be commenced in synchronous condition and can be stopped synchronously. Therefore, any undesirable effects due to unbalanced yarn tension or slackened condition of yarns can be perfectly eliminated.

The above-mentioned driving mechanism provides a very practical advantage for a manufacturing operation. That is, in case the number of the first twist and the second twist are changed in equal ratio, the number of twists can be easily changed by changing the rotating speed of the bottom rollers 28. This change of take up speed is done by changing the gears 47, 48 only. And in case the number of the first twist and the second twist are changed to a different ratio, the twist changing can be done by changing the gears 47, 48 and the gear 55. Further, as the above-mentioned driving mechanism utilizes a common drive motor 35, and the mechanisms for driving the spindles 5 and 10 are very simple, the multiple twisting machine can be compactly built. This is another advantage of the present invention.

Figure 5:
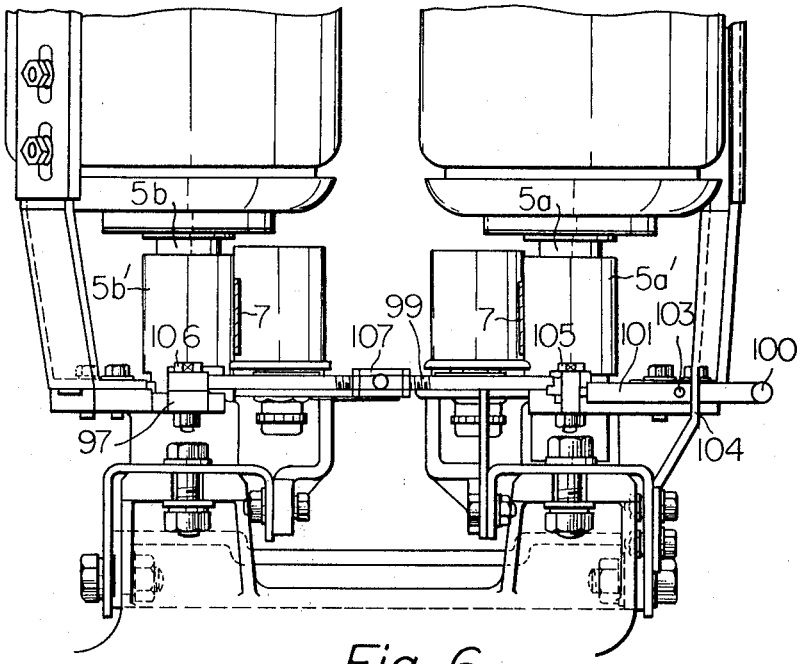
FIGS. 5 and 6 are a plan view and a side view respectively, of a synchronous driving mechanism applied to the first twisting device according to the present invention.
Figure 6:
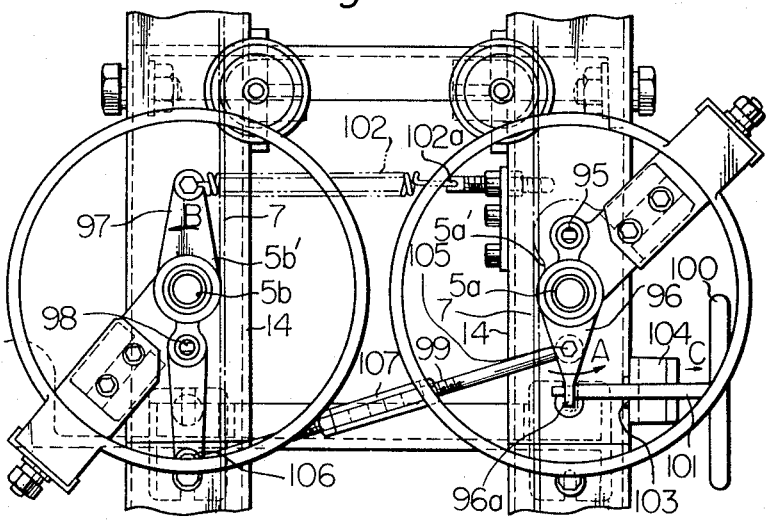

In the above-mentioned multiple twisting apparatus, a particular mechanism for disengaging the spindles 5 from the endless belt 7 is utilized. This is because, if a yarn is broken at one of the two-for-one twisting assemblies 1a or 1b, it is necessary to stop the driving of both spindles 5 of the first twisting device 1 where the yarn is broken. This mechanism is shown in FIGS. 5 and 6, in detail. To provide a better understanding, the mechanism for driving a multiple unit of the twisting assembly is hereinafter explained. The spindle 5a is rotatably mounted on a bearing secured to a supporting arm 96 in such a way that a spindle wharve 5a' of the spindle 5a is capable of being driven by frictional contact with the driving belt 7. Another spindle 5b is rotatably mounted on a bearing secured to another supporting arm 97 in such a way that a spindle wharve 5b′ is capable of being driven by frictional contact with the driving belt 7. These supporting arms 96 and 97 are turnably mounted on the spindle rail 14 about the respective supporting pins 95 or 98. The supporting arm 96 is connected to the supporting arm 97 by means of a connecting rod 99. The connecting rod 99 is [privoted] *pivoted* on the arms 96 and 97 by the respective pivots 105 and 106. Consequently, the turning motion of the arm 96 cooperates with that of the arm 97. A handle 100 is connected to an end 96a of the arm 96 by means of a handle shaft 101. A tension spring 102 is connected to an end of the arm 97 and another end 102a of the tension spring 102 is secured to the spindle rail 14. Consequently, the spindle wharves 5a′, 5b′ are always urged toward the endless belt 7. A stop pin 103 is mounted on the handle shaft 101. A stop plate 104 is mounted on the spindle rail 14 so as to engage with the stop pin 103 when the handle is pulled toward a direction C shown in FIG. 6. When the handle 100 is pulled toward the direction C, the supporting arms 96, 97 are turned about the supporting pins 95, 98 toward the directions indicated by arrows A, B shown in FIG. 6 and, consequently, the contact of the spindle wharves 5a′, 5b′ with the belt 7 is released. In other words, according to the above-mentioned motion of the handle 100, the driving of both spindles 5a, 5b can be simultaneously stopped. On the other hand, if the engagement of the stop pin 103 with the stop plate 104 is released, the arms 96 and 97 are automatically turned about their supporting pins 95, 98 toward the opposite direction to the directions represented by the arrows A, B, because of the spring force created by the tension spring 102. As a result, the spindle wharves 5a′, 5b′ are subjected to engage the endless belt 7 simultaneously. To adjust the contact pressure of the spindle wharves 5a′, 5b′ with the endless belt 7, an adjustment member 107 which changes the length of the connecting rod 99 is mounted on the rod 99. As mentioned above, the spindles of a unit of the first twisting device 1 can be engaged with or disengaged from the endless belt 7 independently of other units of first twisting devices 1, when it is necessary to piece broken yarn ends or to stop for any reason.

To clarify the above-mentioned advantages of the multiple twisting apparatus according to the present invention, the space required for installation of the apparatus, power consumption and comparative data of labor costs were calculated in comparison with the conventional process. The above-mentioned comparison was done for the case of producing 840 denier two ply nylon tire cord at a production rate of 10 t/24 hr. Their data is shown in the following table wherein, process A designates a process utilizing the ring twisting assemblies for imparting a first twist and second twist, process B designates a process utilizing so-called direct double twister which is explained in the starting paragraph of this specification.

TABLE

| | Conventional process | | | Present invention | |
|---|---|---|---|---|---|
| | Process A Ring twisting assembly | | Process B Direct double twister | First twist Two-for-one twisting assembly | Second twist Ring twisting assembly |
| | First twist | Second twist | | | |
| Raw material | Stretched nylon multifilament yarn 840 denier 840 D/2 | | | | |
| Cord construction | | | | | |
| Number of twist | 47.0 (Z twist) × 47.0 (S twist) T/10 cm | | | | |
| Spindle r.p.m. | 6,500 | 5,500 | 6,500 | 3,500 | 7,000 |
| Machine efficiency | 95% | | | | |
| Size of ring (diameter) in mm | 101.6 | 139.7 | — | — | 165.1 |
| Space required for machine installation ($m^2$) | 810 | | 1.115 | 405 | |
| Number of spindles or units of assembly in each apparatus | 216 | 140 | 40 | 400 | 200 |
| Number of apparatus | 23 | 23 | 60 | 11 | |
| Power consumption (KWH/100 kg product) | 141 | | 264 | 126 | |
| Comparative data of labor cost per 100 kg product | 1.1 | | 0.6 | 0.4 | |

As it is clearly shown in the above-mentioned table, the space required for machine installation, power consumption and labor cost can be remarkably reduced by utilization of the multiple twisting apparatus according to the present invention. Further, if the mode of arrangement of the two-for-one twisting assemblies along the front and back alignment is compared with the mode of arrangement of the two-for-one twisting assemblies along a single alignment it can be understood that the former mode of arrangement according to the present invention has also remarkable advantages compared to the latter mode of arrangement. That is, the latter mode of arrangement requires 1.48 times, 1.20 times, 1.41 times, the machine space, labor cost for doffing and donning and labor cost for inspection of the state of machine movement of that of the apparatus of the present invention, respectively.

In the above-mentioned embodiment of the multiple twisting apparatus, a single motor is utilized to drive the entire machine. However, since there is a tendency lately to speed up the driving speed of the machine, it is preferable to drive the first twisting element and the second twisting element by separate driving motors, respectively. It is also useful to drive the feeding mechanism by a separate driving motor. Such modified driving systems applied to the multiple twisting apparatus according to the present invention are hereinafter explained in detail. In the following explanation, the elements having functions similar to the elements shown in the abovementioned first embodiment are represented by reference numerals identical to the first embodiment and their explanations are omitted to avoid duplicate explanations.

Figure 7:
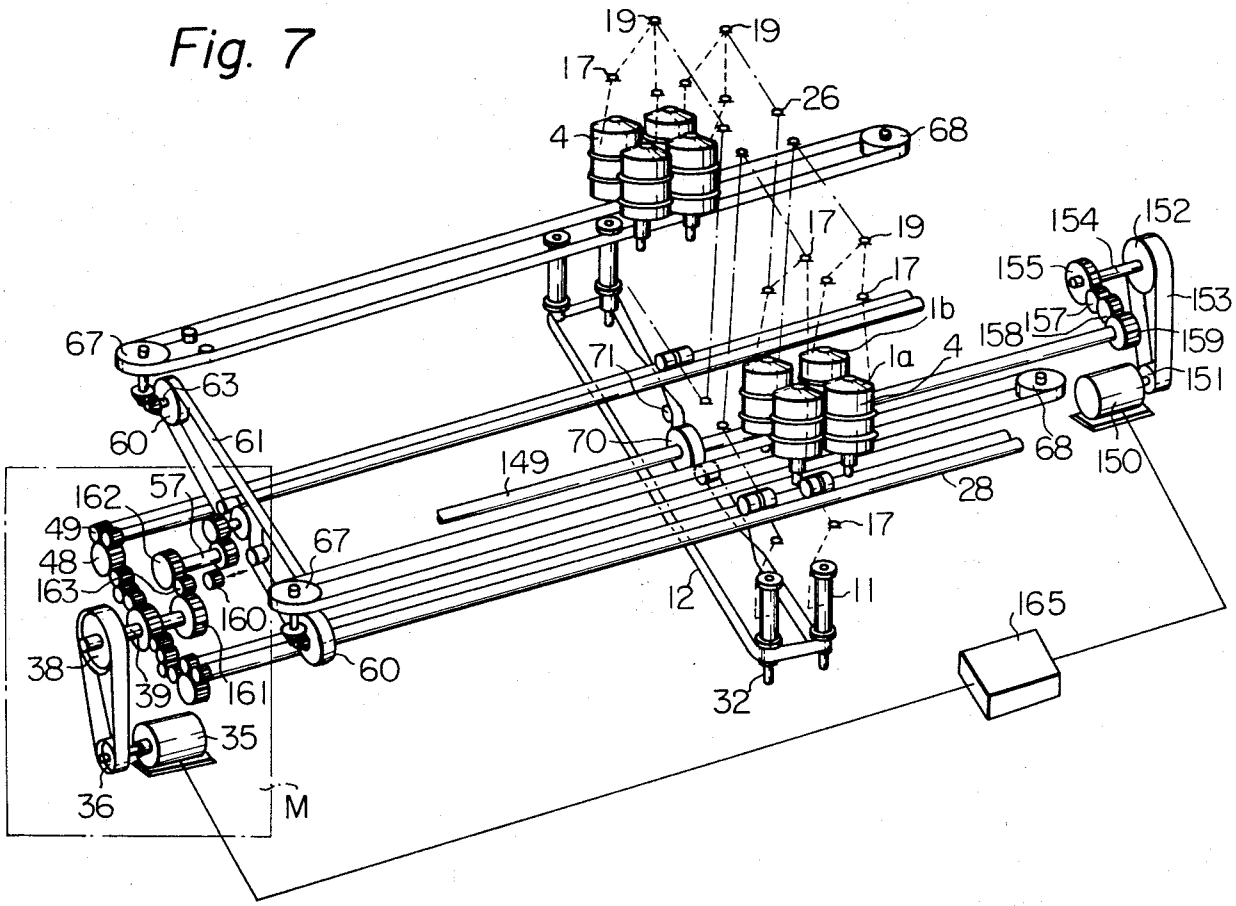
FIGS. 7, 8, 9, 10, 11 and 12 are schematic perspective views of the multiple twisting apparatus provided with modified driving systems according to the present invention.

The embodiment shown in FIG. 7 is provided with a modified driving system for driving the first twisting elements independently from other driving systems of the apparatus. That is, it may be understood that, the system for driving the first twisting elements is only changed as shown in FIG. 7. The above-mentioned modified system for driving the first twisting elements is hereinafter explained in detail. In this embodiment, instead of driving the pulley 70 directly from the main shaft 39 as in the first embodiment shown in FIG. 1, an independent reversible motor 150 is utilized for driving the pulley 70. To drive the motors 150 and 35 in synchronous condition, these motors 35 and 150 are electrically connected by way of a synchronizing device 165. The pulley 70 is driven by the motor 150 by means of a power transmission mechanism comprising a pulley 151 secured to a shaft of the motor 150 and a shaft 154 turnably supported by a bracket (not shown) secured to the machine frame, a pulley 152 secured to the shaft 154 and driven by the pulley 151 by way of an endless belt 153, a gear 155 secured to the shaft 154, a gear 159 secured to a shaft 149 whereon the pulley 70 is mounted, and a pair of intermediate gears 157, 158 which transmit the driving power of the gear 155 to the gear 159. An additional gear 160 is mounted to the main gear box M so as to change the rotational direction of the shaft 57 which transmits driving power to the first twisting assemblies. That is, when it is required to impart first and second twists in reverse direction to the normal twist, for example [as a twist], *the first twist is "S" twist and the second twist is "Z" twist,* the polarity of the input power to the motor 150 is changed in a conventional manner so as to change the rotational directional of the motor 150. On the other hand, the rotational direction of the first twisting assemblies are changed in the following way. That is, in the power transmission mechanism comprising a gear 161 secured to the main shaft 39, a gear 162 secured to the shaft 57 and an intermediate gear 163 which transmits a power from the gear 161 to the gear 162, the additional gear 160 is added in such a way that a gearing composed of the gears 160 and 163 transmits the power from the gear 161 to the gear 163. Therefore the gear 160 is identical to the gear 163. In this embodiment, as the first twisting element and the second twisting element are driven by separate motors, high speed driving of the machine can be effectively carried out.

To drive the motor 150 in a synchronous condition to the driving motor 35, the motor 150 is connected to the electric source through a synchronizing device 165. The structure and the function of the synchronizing device 165 is hereinafter explained in detail.

Figure 19:
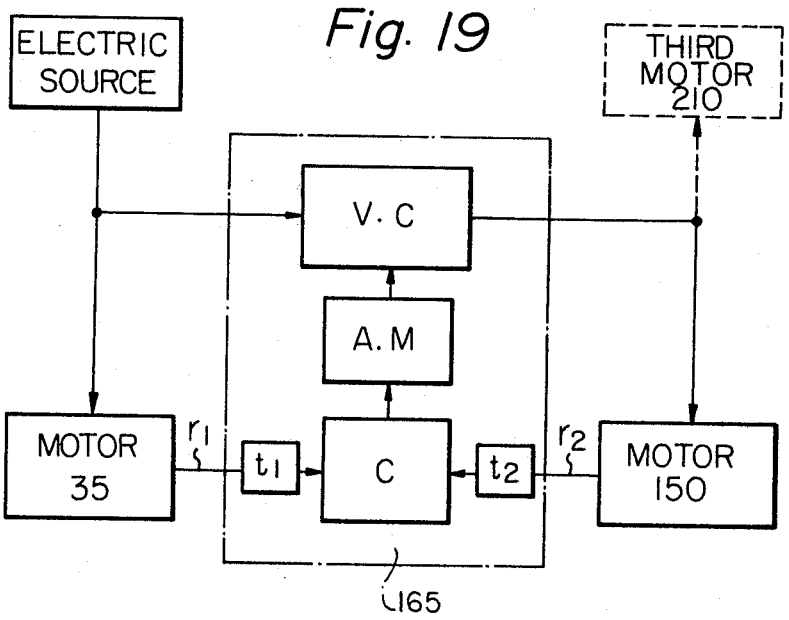
FIG. 19 is a block diagram of the synchronizing device utilized for the driving system of the embodiments of the multiple twisting apparatus provided with at least two motors for driving the apparatus, according to the present invention.

Referring to FIG. 19, in the synchronizing device 165, a first motor 35 is connected to an electric power source and driven at a speed $S_1$, while a second motor 150 is connected to the electric source through a speed control circuit V. C. such as a field current controller, and driven at speed $S_2$. A conventional speed detector $t_1$, such as a taco-generator, is connected to a shaft $r_1$ of the first motor 35 so as to create a voltage $V_1$ which is proportional to the rotational speed $S_1$ of the first motor 35, while another speed detector $t_2$ is connected to a shaft $r_2$ of the second motor 150 so as to create a voltage $V_2$ which is proportional to the rotational speed $S_2$ of the second motor 150. The above mentioned output voltages $V_1$ and $V_2$ of the speed detectors $t_1$ and $t_2$ are applied to a voltage comparator C. The voltage comparator C provides a positive voltage $V_0$ which corresponds to $(V_1-V_2)$ when $V_2$ is smaller than $V_1$, or a negative voltage $V_0$ which corresponds to $(V_1-V_2)$ when $V_2$ is larger than $V_1$. The above-mentioned output signal from the voltage comparator C is than applied to the speed control circuit V. C. through an amplifier AM so as to adjust the electric power which is supplied to the second motor 150 from the electric power source. That is, if $V_2$ is smaller than $V_1$, the electric power to the motor 150 is increased, and vice versa. Consequently, the rotational speed $S_2$ of the second motor $M_2$ follows the rotational speed $S_1$ of the first motor 35 so that the first and second motors 35 and 150 can be synchronously driven.

Figure 10:
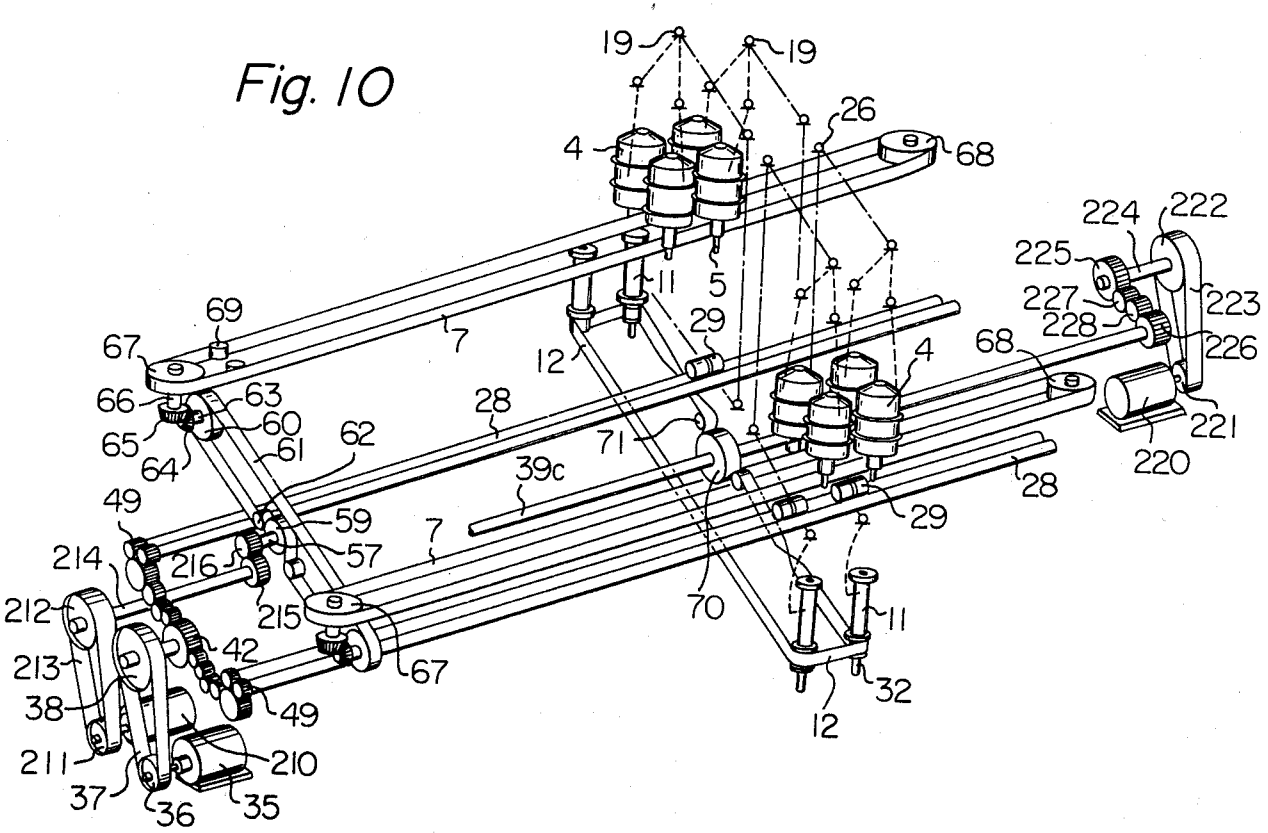
Figure 11:
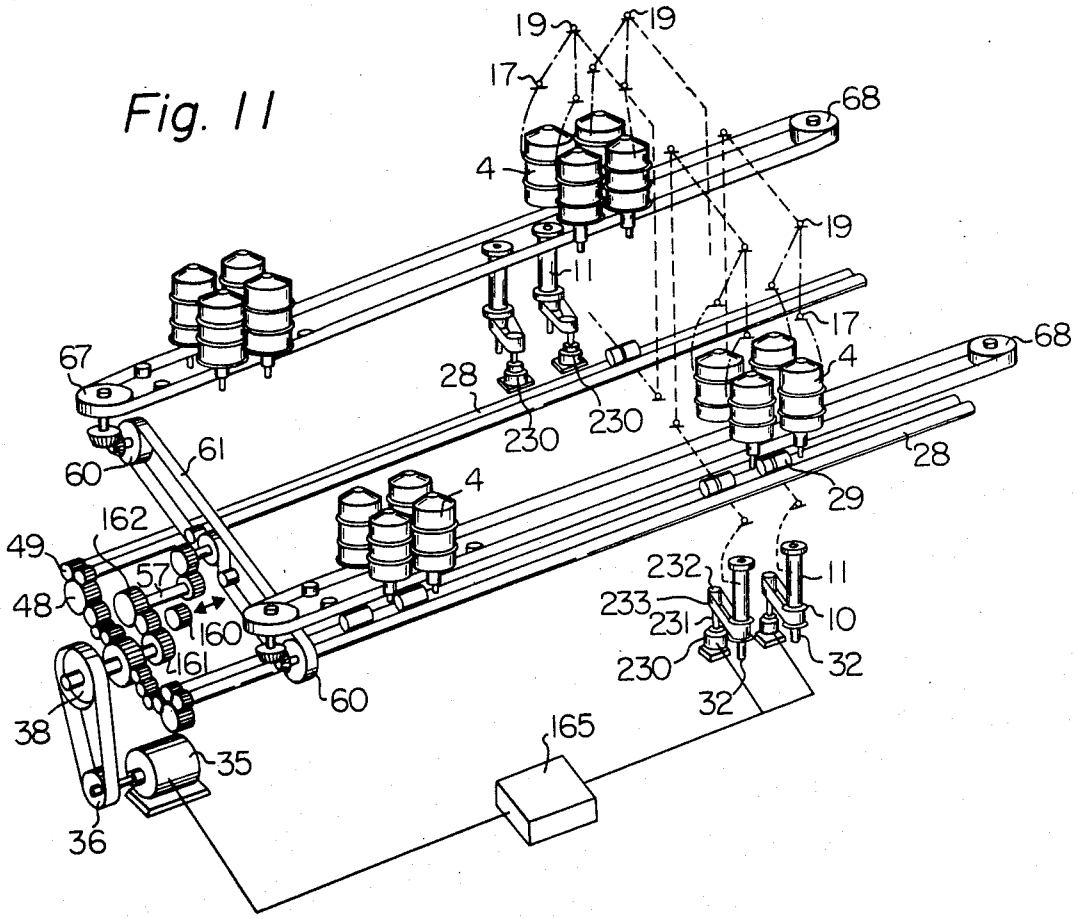
Figure 12:
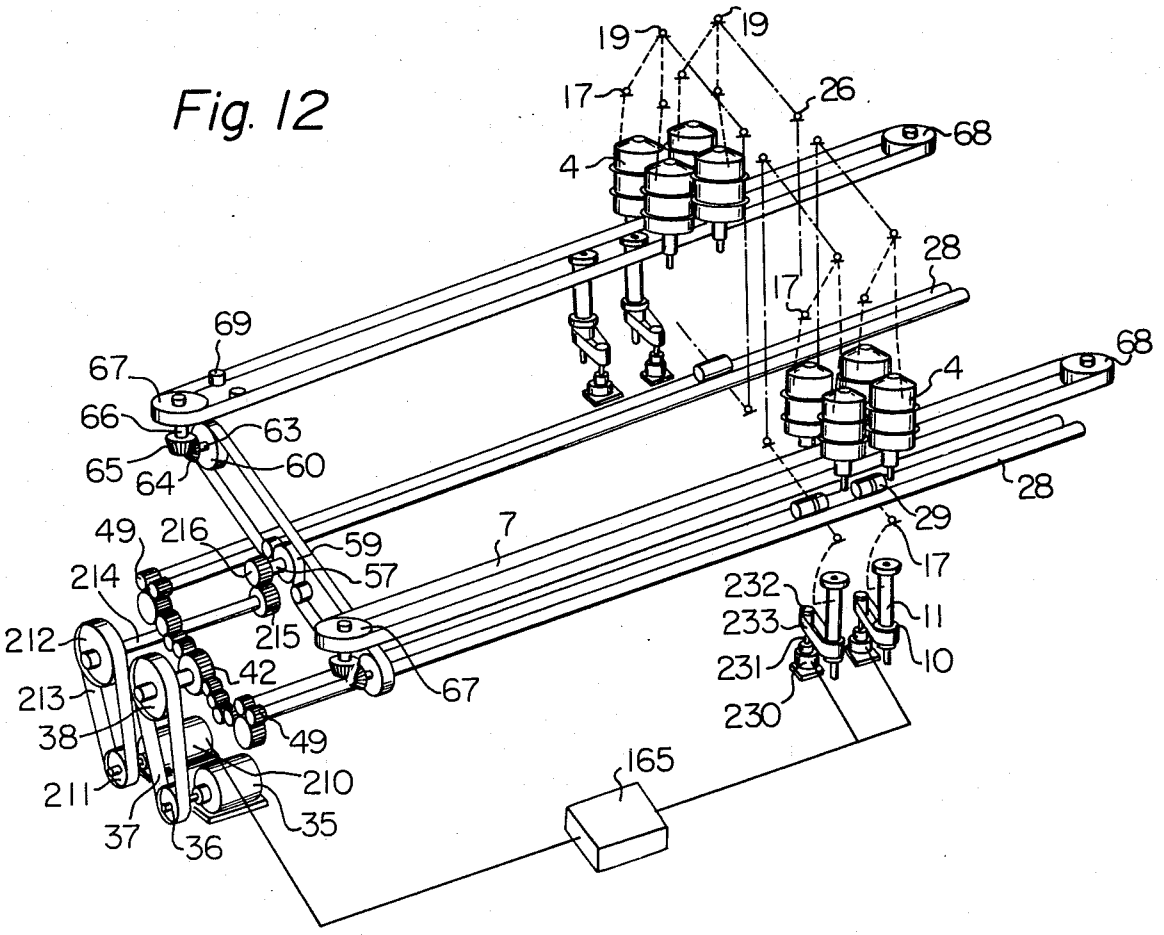

In the case of the driving system applied to the embodiments shown in FIGS. 11 and 12, wherein each second twisting assembly is driven by an individual motor, a convertor or inverter can be utilized instead of the amplifier AM and voltage comparator C. And in the case of utilizing three motors as in the embodiment shown in FIG. 10, the third motor 210 is connected to the electric power source through the speed control circuit V. C.

Figure 8:
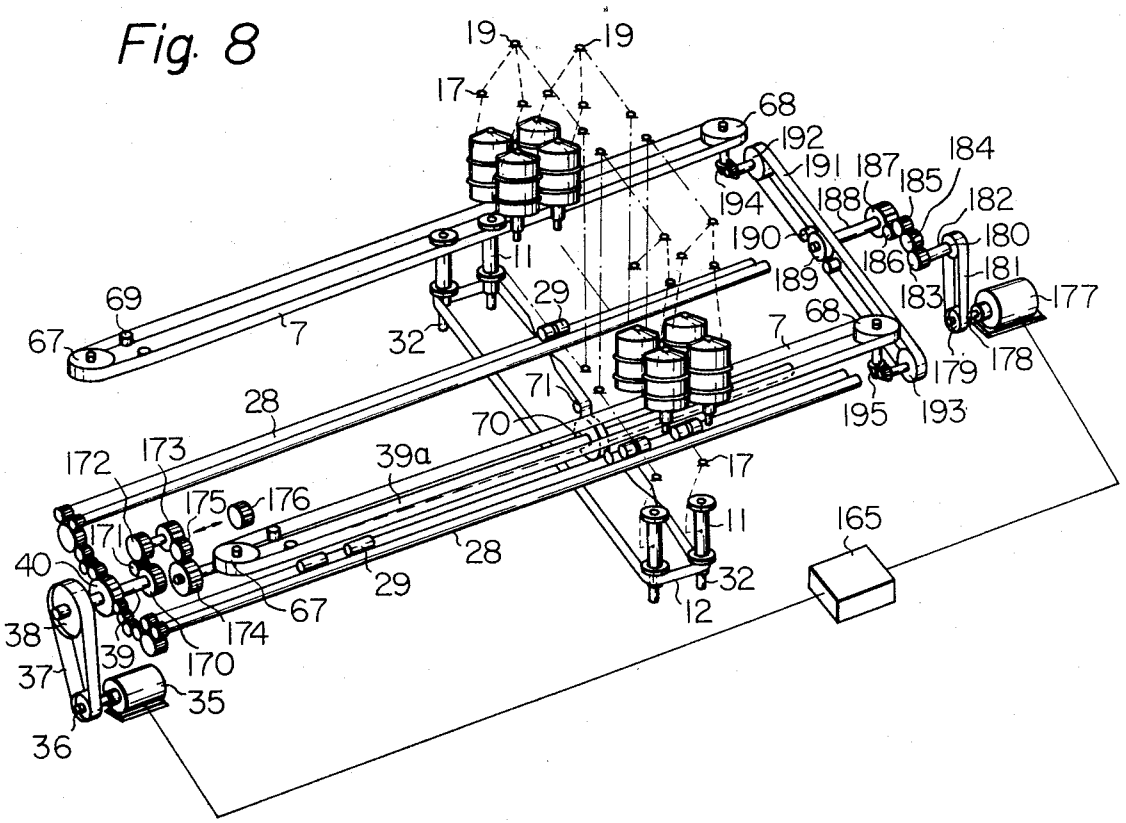

Another modification of the driving system shown in FIG. 1 is disclosed in FIG. 8. In this modified driving system, the first twisting element is driven by a first driving motor, while the second twisting element and the feeding element are driven by a second driving motor. That is, in the first embodiment shown in FIG. 1, the mechanism for driving the feeding element comprising a pair of bottom rollers 28, and the mechanism for driving the first twisting elements are modified as hereinafter explained with reference to FIG. 8. In this modification, the pulley 70 is secured on a shaft 39a which is separated from the shaft 39. The shaft 39a is driven by the shaft 39 by way of a gear train comprising a gear secured on the shaft 39, a gear 172 which is driven by the gear 170 by way of a first transmission gear 171, a gear 173 secured on a shaft of the gear 172 and a second transmission gear 175 which transmits the driving power from the gear 173 to a gear 174 secured on the shaft 39a. An additional transmission gear 176 is utilized for changing the rotational direction of the gear 174 in such a manner that the driving power of the gear 173 is transmitted to the gear 174 by way of the gear train composed of the gears 175 and 176. A second motor 177, which is a reversible motor, is electrically connected to the motor 35 by way of the synchronizing mechanism 165 as in the embodiment shown in FIG. 7. Each pulley 68 of the mechanism for driving the first twisting element is driven by the motor 177 by way of the following power transmission mechanism. That is the power transmission [mechansim] *mechanism* which comprises a pulley 179 secured to a shaft 178 of the motor 177, a pulley 180 is driven by the pulley 179 by way of an endless belt 181. A gear 183 is secured to a shaft 182 whereon the pulley 180 is rigidly mounted. A gear 187 is driven by the gear 183 by way of a gear train composed of a pair of transmission gears 184 and 186, an intermediate transmission gear 185 meshes with the gears 184 and 186. A pulley 189 secured on a shaft 188 of the gear 187. A pair of pulleys 192 and 193 is driven by the pulley 189 by way of an endless belt 191, which is always tensioned by a plurality of tension rollers 190, and a pair of bevel gear trains 194 and 195, as shown in FIG. 8. In this embodiment, if it is required to impart twist having a twist direction which is the reverse of the normal twist direction, such reversed twisting can be easily attained by changing the polarity of the input power to the motor 177 and adding the additional gear 176 into the transmission gear train between the gears 173 and 174.

Figure 9:
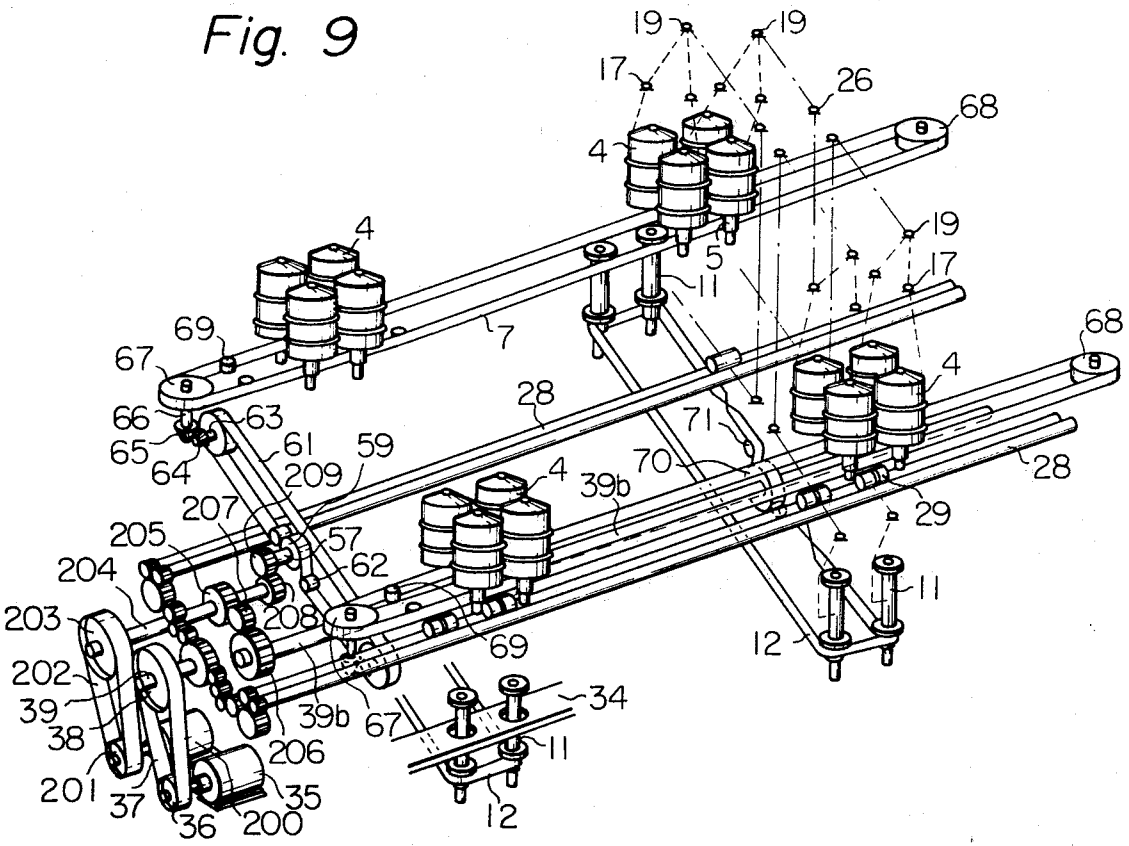

The third modification of the system for driving the twisting machine according to the present invention is shown in FIG. 9. In this modification, the first and second twisting elements are driven by a first motor while the feeding element is driven by a second motor. The first and second motors are driven synchronously by way of a synchronizing device (not shown) as in the above-mentioned first and second modification. In this modification, the first and second twisting elements are driven by a first motor 200 which is a reversible motor, while the feeding elements that is, the bottom rollers 28, is driven by a second motor 35 as in the first embodiment shown in FIG. 1. The first and second twisting elements are driven by a power transmission mechanism as hereinafter described in detail. That is, the driving power of the motor 200 is transmitted to the pulley 59, which drives the first twisting elements, by way of a power transmission mechanism comprising a pulley 201 secured on a shaft of the motor 200 and a pulley 203 which is driven by the pulley 201 by way of an endless belt 202, a gear 208 rigidly mounted on an end portion of a shaft 204 whereon the pulley 203 is rigidly mounted a gear 209 secured on the shaft 57 of the pulley 59 in such a condition that the gear 209 meshes with the gear 208. Th shaft 39b of the pulley 70, which drives the endless belt 12 of the second twisting elements, is driven by a gear 205 secured on the shaft 204 by way of a gear train composed of a gear 206 rigidly mounted on the shaft 39b via a transmission gear 207 which meshes with the gears 205 and 206. When it is required to impart first and second twists having twisting directions which are the reverse of the normal twisting direction, respectively, such requirement can be satisfied by changing the polarity of the input power to the reversible motor 200.

In the fourth modification of the driving system shown in FIG. 10, the first twisting elements, the second twisting elements and the feeding elements are driven separately from each other by respective motors. These motors are driven in synchronous condition by a synchronizing device (not shown) as in the embodiments shown in FIGS. 7, 8 and 9. In this embodiment, a first motor 210 is utilized for driving the first twisting elements while a second motor 220 is utilized for driving the second twisting elements. These motors 210 and 220 are reversible motors. Consequently, changing the twisting direction of the yarn can be easily carried out by simultaneously changing the polarity of the input electric power to these reversible motors 210 and 220. On the other hand, the feeding element, that is, the bottom rollers 28 are driven by the motor 35 in a manner similar to the first embodiment shown in FIG. 1. The pulley 59 for transmitting the driving power to the first twisting elements is driven by the first motor by way of a power transmission mechanism comprising a pulley 211 secured to a shaft of the motor 210, a pulley 212 driven by the pulley 211 by way of an endless belt 213, a gear 215 secured to a shaft 214 of the pulley 212 and a gear 216 secured on the shaft 57 of the pulley 59 in such a condition that the gear 216 meshes with the gear 215. Each pulley 70 for driving a group of the second twisting elements is driven by the second motor 220 by way of a power transmission mechanism comprising a pulley 222 driven by the pulley 221 by way of an endless belt 223, a gear 225 secured on a shaft 224 of the pulley 222, a gear 226 secured on an end of a shaft 39c whereon a plurality of pulleys 70 are rigidly mounted, a power transmission gear train composed of a pair of gears 227 and 228 disposed in such a manner that the gear 225 transmits its driving power to the gear 226 therethrough. In this embodiment, since the first and second twisting elements, *and* the feeding element are driven by [and] the respective motors separately, the relative twisting ratio between the first and second twist can easily be changed over a broad range by changing the rotational speed of these motors 35, 211 and 220 or by changing the size of the respective pulleys 38, 212 and 222. The above-mentioned flexibility of changing the relative twisting ratio is one of the characteristic features of this modification.

In the fifth modification of the driving system according to the present invention shown in FIG. 11, each spindle of the ring twisting element, which is the second twisting element, is driven by an individual motor 230, instead of utilizing the driving system by the motor 150 shown in FIG. 7. That is, each spindle 10 is driven by the reversible motor 230 by way of an individual power transmission mechanism comprising a pulley 232 secured on a shaft 231 of the motor 230, and an individual endless belt 233 which transmits the driving power of the pulley 232 to the spindle 10. Other structural and functional *features* of the twisting machine are similar to the first modified embodiment shown in FIG. 7 and, therefore, their explanation is omitted. When it is required to change the twisting direction, the polarity of the input power of each motor 230 is simultaneously changed with the change of transmission gearing between the gears 161 and 162 in a manner similar to the above-mentioned first modified embodiment. As each second twisting element is driven by an individual motor 230, high speed driving of the spindles 10 can be easily carried out.

The sixth modification of the driving system according to the present invention is shown in FIG. 12. In the driving system shown in FIG. 12, the first twisting elements and the feeding element are separately driven by the respective power transmission mechanisms provided with the respective motors 210 and 35, which are utilized in the fourth modified embodiment shown in FIG. 10, and the second twisting elements are driven by the individual motor driving system which is utilized in the fifth modification shown in FIG. 11. In this sixth modification, the motor 210 and each individual motor 230 are driven synchronously by way of the synchronizing device 165. Like the other modifications of the driving system according to the present invention, the sixth modification of the driving system is very useful for producing large packaged bobbins and for speeding up the driving system of the twisting element.

Figure 13:
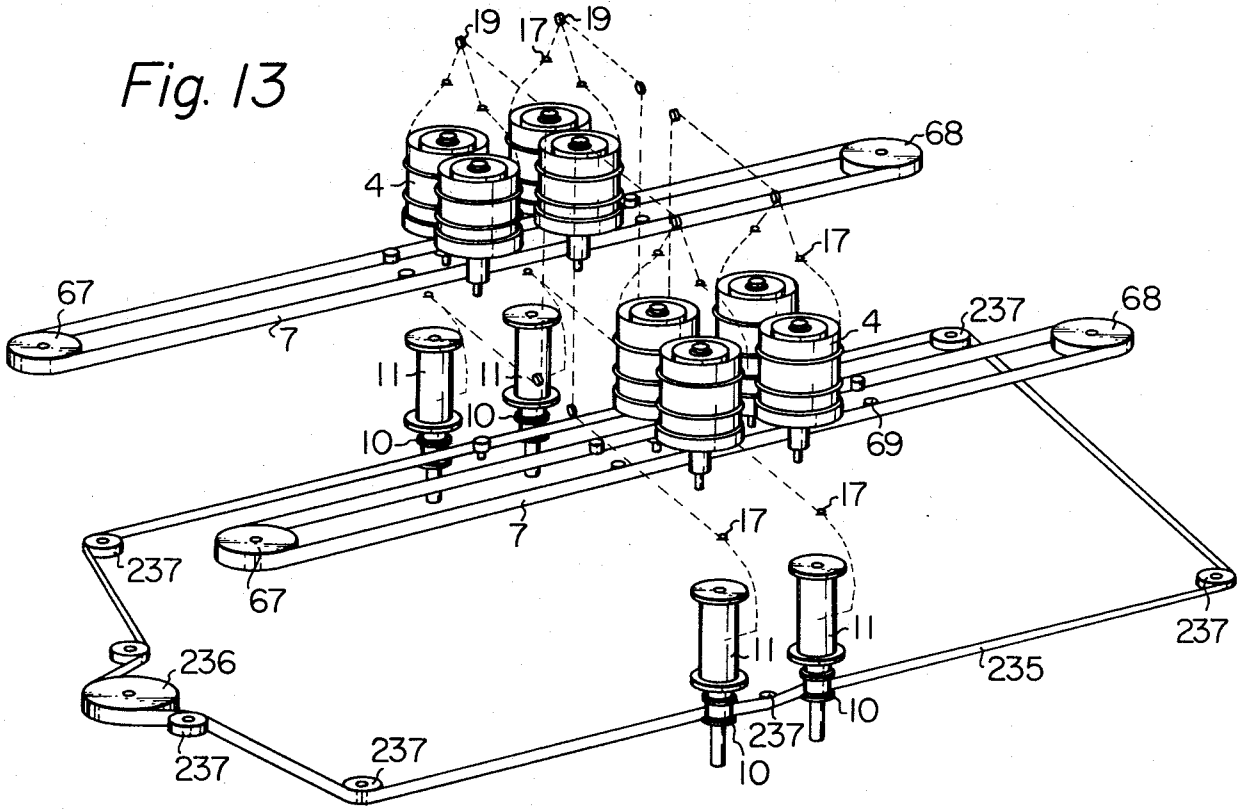
FIGS. 13 and 14 are schematic perspective views of modified driving systems of the second twisting devices of the multiple twisting apparatus according to the present invention.
Figure 14:
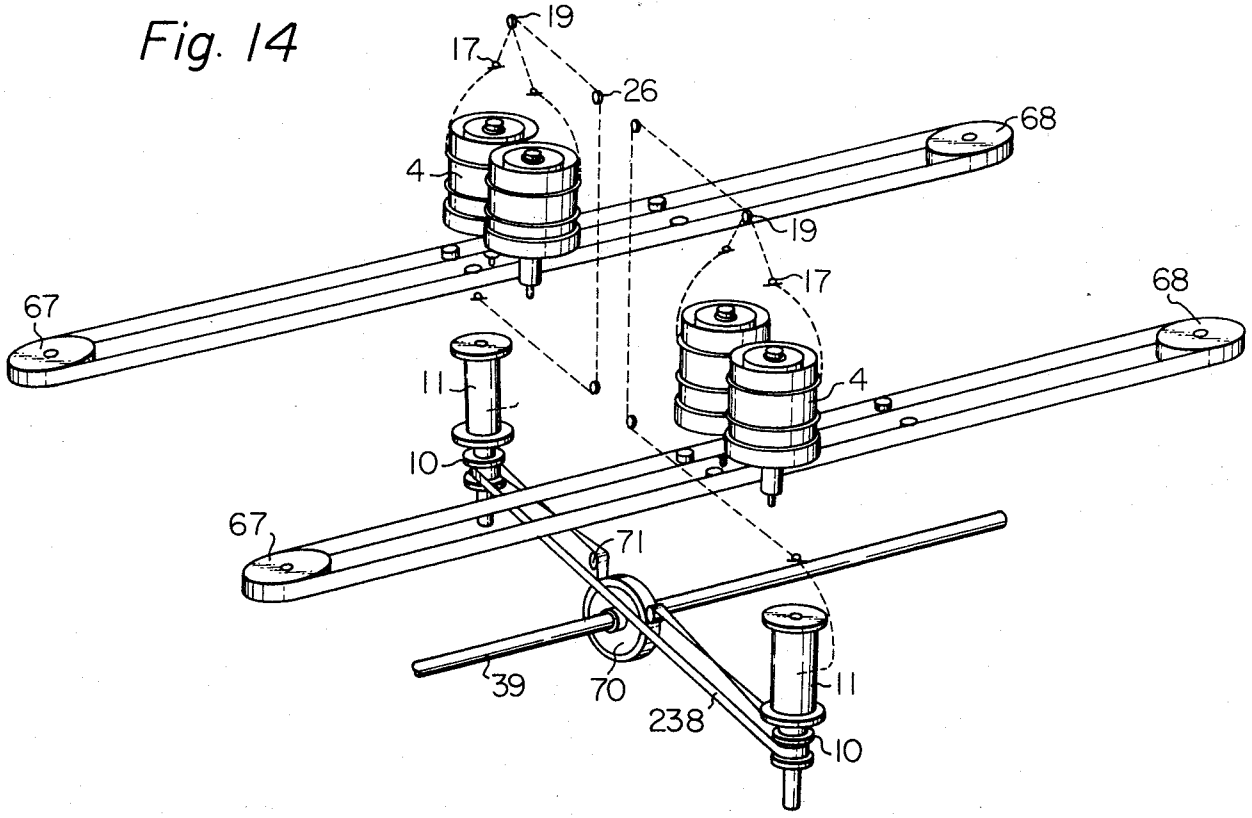

Several modifications of the driving system for the second twisting element are shown in FIGS. 13 and 14. As shown in FIGS. 1, 7, 8, 9, and 10, four spindles 10 of the second twisting elements are driven by a common endless belt 12, in the twisting machines according to the present invention. To simplify the above-mentioned driving mechanism, a common endless belt 235 as shown in FIG. 13 may be utilized for all spindles of the twisting machine instead of the abovementioned group driving system. In this case, the common endless belt 235 is driven by a driving pulley 236 which is driven by a suitable driving mechanism (not shown), and all spindles 10 are driven by the common endless belt 235. In this driving system shown in FIG. 13, 237 designates tension guide rollers. However, the above-mentioned systems for driving the spindles 10 are not desirable in the case where the number of spindles 10 is too large, because the load applied to the common endless belt 235 becomes so large that the belt 235 is damaged in a short period of running. This undesirable feature is increased in the case of processing large packaged bobbins 11.

Figure 15:
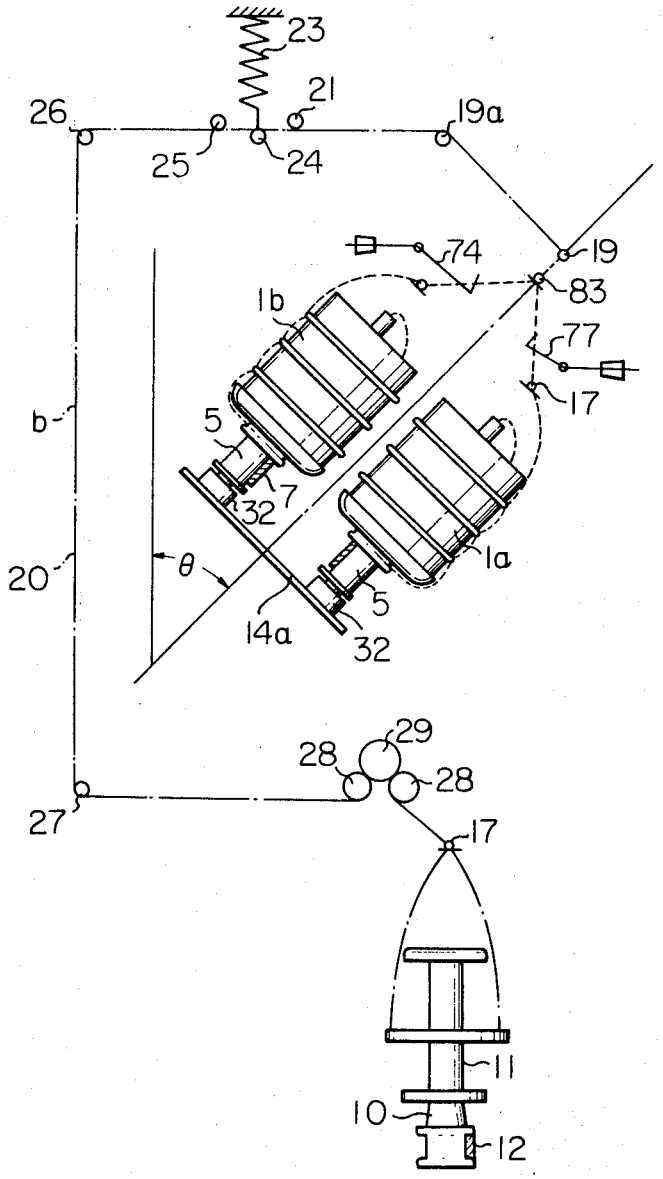
FIG. 15 is a schematic side view of a twisting unit of the multiple twisting apparatus according to the present invention.

A modified belt driving system for driving the spindles 10 is shown in FIG. 14. In this modification, a pair of spindles 10 of the second twisting elements disposed at both sides of the twisting apparatus are driven by a common endless belt 238. As only two spindles 10 are driven by the common belt 238, it can be expected that the slip between the wharves of each spindle 10 and the endless belt 238 will be reduced or eliminated and, consequently a very uniform twisting operation can be carried out. This meritorious effect becomes particularly advantageous in the case of carrying out a twisting operation for a large packaged bobbin. In the above-mentioned embodiments shown in FIGS. 1, 7, 8, 9, 10, 11, 12, 13 and 14, the spindles 5 of each of the two-for-one twisting assemblies 1a, 1b of the first twisting element 1 are disposed in upright condition. However, as already explained, in the summary of the present invention, the spindle 5 is preferably held in an inclined condition as shown in FIG. 15. That is, in the embodiment shown in FIG. 15, each spindle 5 is turnably held by a spindle bolster 32 which is secured on a spindle rail 14a in such a condition that each spindle 5 of the two-for-one twisting element 1 is mounted on a bracket of the twisting apparatus with an angle $\theta$ between the upright direction and the spindle axis. The angle is in a range between 0°–90°, and is preferably in a range between 0° and 45°. The above-mentioned angle $\theta$ should be selected based on the consideration of ease in handling the yarn packages and also of effective balloon control during the operation. That is, when the angle $\theta$ is larger, the handling of the yarn packages at the time of mounting them on the first twisting element 1 becomes more convenient but, on the other hand, uniform balloon control becomes more difficult to attain.

Next, the relative disposition of the component twisting assemblies of the first twisting element 1 is explained.

Figure 16:
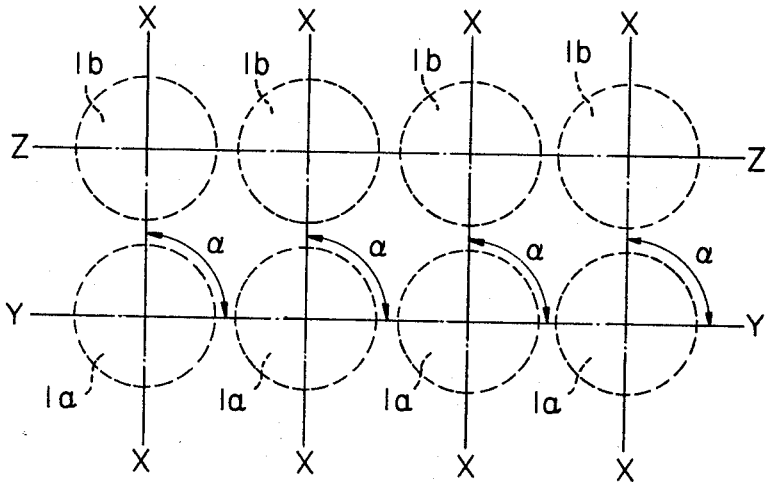
FIG. 16 is a diagram showing a relative arrangement of the component twisting assemblies of a plurality of first twisting elements according to the present invention.

Referring to FIG. 16, wherein the relative arrangement of the component twisting assemblies 1a and 1b of a plurality of first twisting elements 1 is shown by a plan view thereof, an angle $\alpha$ between a line X—X, which passes through the axial centers of the component twisting assemblies 1a and 1b of each first twisting element 1, and a line Y—Y, which passes through the axial centers of each twisting assembly 1a aligned at the front side of the twisting machine, or a line Z—Z, which passes through the axial centers of each twisting assembly 1b aligned at the rear side of the twisting machine, is preferably selected in a range between 60° and 90°. The selection of the angle $\alpha$ mainly depends upon the users needs, such as dependent upon users desire how to make the twisting machine compact, etc.

Figure 17:
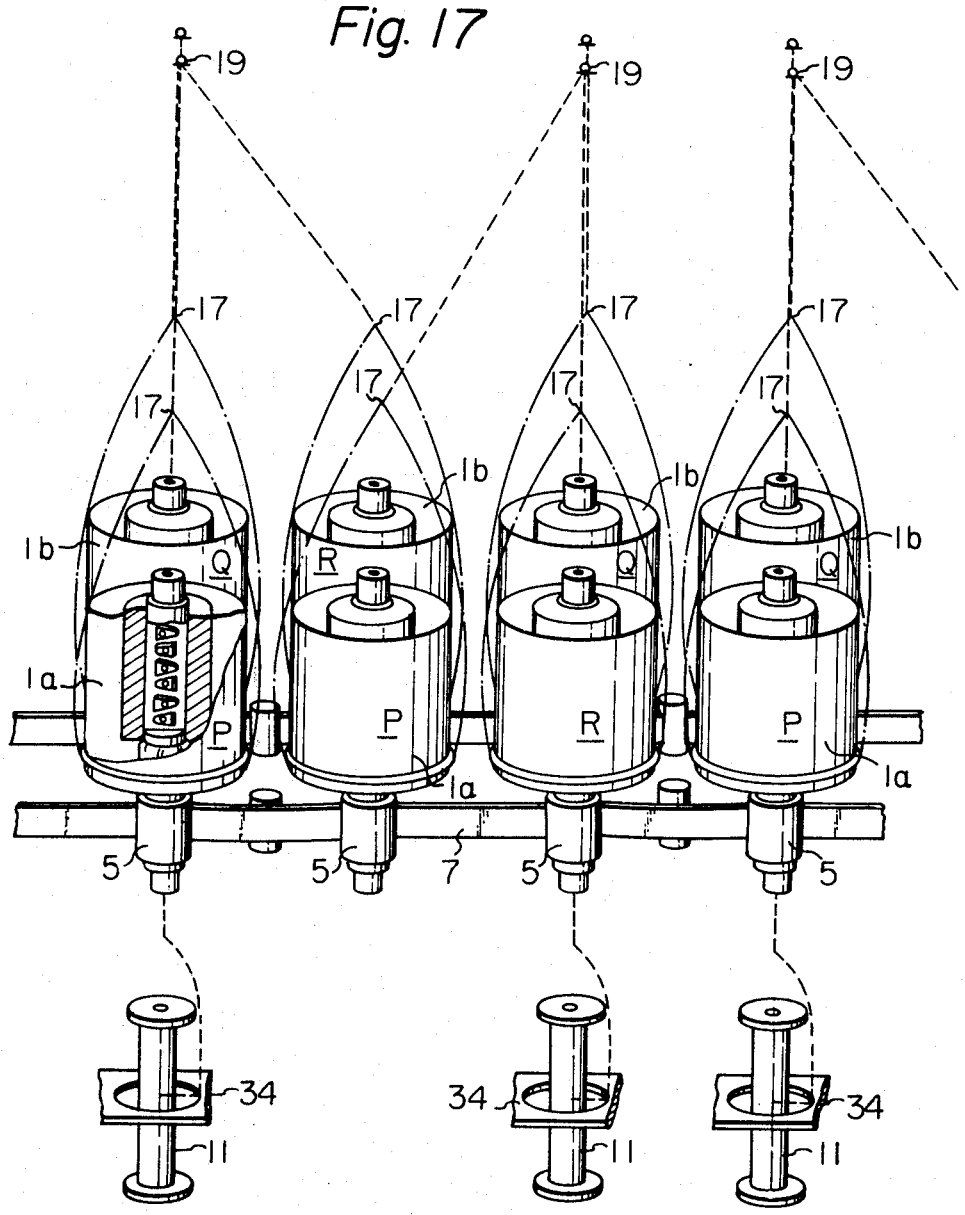
FIGS. 17 and 18 are schematic front views of a plurality of twisting units of the multiple twisting apparatus according to the present invention for producing three [piled] *plied* yarn.
Figure 18:
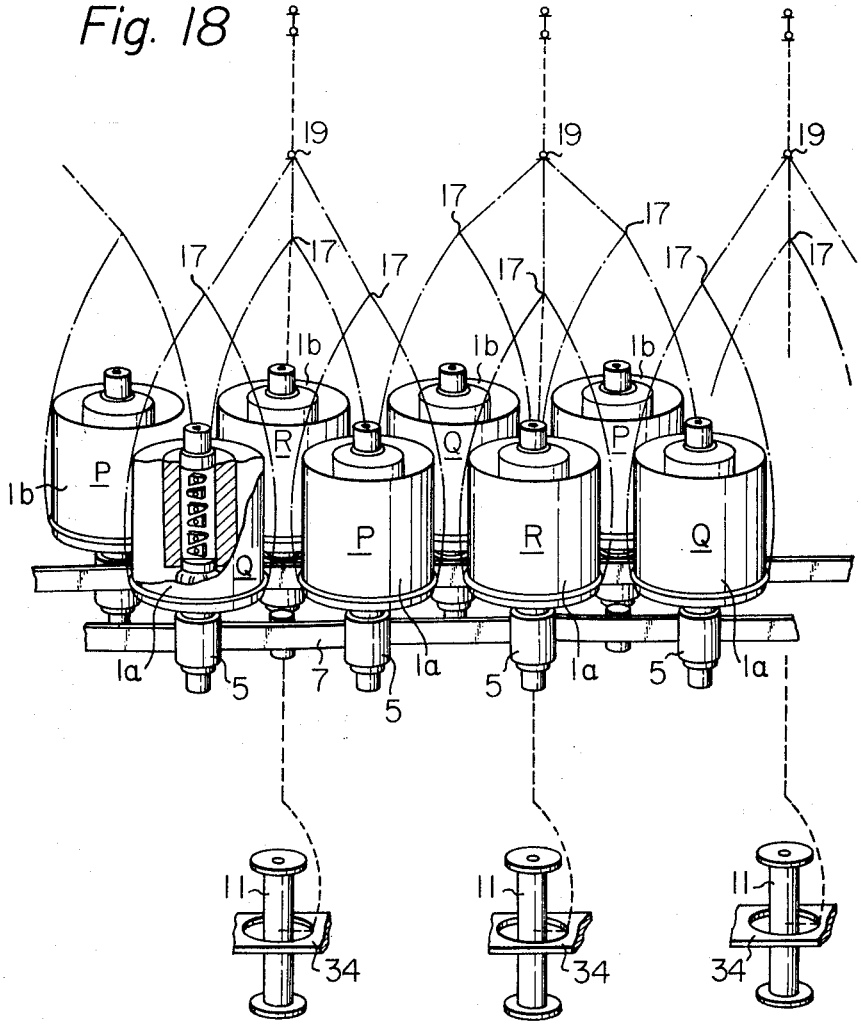

In the case of producing three plied yarn, triple component twisting assemblies are utilized as shown in FIGS. 17 and 18. In the embodiment shown in FIG. 17 the component twisting assemblies 1a and 1b are arranged in two parallel alignments along the longitudinal direction of the twisting machine in such a condition that the above-mentioned angle $\alpha=90°$. In FIG. 17, to identify the three component assemblies for producing three plied yarn in the above-mentioned disposition of the first twisting assemblies, these component twisting assemblies are identified by P, Q and R. In this embodiment, the distances between the common thread guide 19 and the respective yarn guides 17 of the component twisting assemblies identified by P, and Q and R, are not identical, because of the above-mentioned arrangement of the component twisting assemblies 1a, 1b. Therefore, it is very difficult to create a uniform doubling operation under balanced yarn tensions between the yarns delivered from the respective component twisting assemblies P, Q and R.

To eliminate the above-mentioned undesirable feature, of the embodiment shown in FIG. 17, it is preferable to select the angle at 60° and the thread guide 19 utilized for each group of triple first twisting assemblies P, Q and R [be] *are* positioned so as to satisfy the condition that the distances between the thread guide 19 and the respective yarn guides 17 of the component assemblies P, Q and R are identical as shown in FIG. 18. Further, in this embodiment, the spindles 10 of the second twisting assemblies are arranged with a spindle pitch identical to the intervening space between two adjacent thread guides 19. Accordingly, a very uniform tension control in making three plied yarn can be easily carried out. The above-mentioned arrangement of the component twisting assemblies P, Q, and R for producing the three plied yarn is preferably applied in the case of utilizing large packaged yarn bobbins, because of the increased difficulty in controlling the yarn tension thereof when compared with utilizing the smaller size yarn bobbins.

What we claim is:

1. A multiple twisting apparatus having at least one twisting unit, comprising a first twisting device provided with at least two two-for-one twisting assemblies, each of said two-for-one twisting assemblies being provided with a first tension control means disposed therein, means for doubling first-twisted yarns withdrawn from said two-for-one twisting assemblies, a second twisting device disposed below said first twisting device for imparting a second twist to a doubled yarn carried from said means for doubling, means for positively feeding said doubled yarn to said second twisting device, a plurality of yarn guides forming a yarn passage behind said first twisting device and forming a yarn passage to said feeding means, and means for driving said first twisting device, said second twisting device and said feeding means.

2. A multiple twisting apparatus according to claim 1, wherein said driving means comprises means for synchronously driving said first twisting device, said second twisting device and said means for feeding during at least a period of commencing and at the time of stopping said apparatus.

3. A multiple twisting apparatus according to claim 2, wherein said means for driving comprises intermediate power transmission mechanisms, and a motor for driving said first twisting device, said means for feeding and said second twisting device by way of said intermediate power transmission mechanisms.

4. A multiple twisting apparatus according to claim 2, wherein said means for driving *comprises* a first motor, intermediate power transmission mechanisms coupled to said first motor for driving said means for feeding together with said second twisting device, a second motor, and an intermediate power transmission mechanism coupled to said second motor for driving said first twisting device.

5. A multiple twisting apparatus according to claim 2, wherein said means for driving comprises a first motor, intermediate power transmission mechanisms coupled to said first motor for driving said means for feeding together with said first twisting device, a second motor and an intermediate power transmission mechanism coupled to said second motor for driving said second twisting device.

6. A multiple twisting apparatus according to claim 2, wherein said means for driving comprises a first motor, an intermediate power-transmission mechanism coupled to said first motor for driving said means for feeding, a second motor, and an intermediate power transmission mechanism coupled to said second motor for driving said first twisting device and said second twisting device.

7. A multiple twisting apparatus according to claim 2, wherein said means for driving comprises a first motor for driving said means for feeding, a second motor for driving said first twisting device, a third motor for driving said second twisting device, and separate intermediate power transmission mechanisms coupled to said first, second and third motors.

8. A multiple twisting apparatus having at least two twisting units according to claim 2, wherein said means for driving for said second twisting devices comprises an individual driving motor corresponding to each of said second twisting devices.

9. A multiple twisting apparatus according to claim 2, wherein said means for driving comprises a first belt-drive system having an endless belt for driving spindles of said two-for-one twisting assemblies of all twisting units and a second belt-drive system having an endless belt for driving spindles of said second twisting device of all twisting units.

10. A multiple twisting apparatus according to claim 9, wherein said second belt-drive system comprises a plurality of endless belts coupled to drive said second twisting devices, said second twisting devices being disposed at both sides of said twisting apparatus in facing condition, respectively.

11. A multiple twisting apparatus according to claim 9 wherein said second belt-drive system comprises a plurality of endless belts for driving four second twisting devices, said four second twisting devices being disposed at both sides of said twisting apparatus in such a condition that two of said second twisting devices are disposed at a first side of said twisting apparatus with a predetermined spindle pitch therebetween while the other two second twisting devices are disposed at another side of said twisting apparatus in facing condition to said two twisting devices disposed at said first side.

12. A multiple twisting apparatus according to claim 1, wherein said two-for-one twisting assemblies of all twisting units are arranged in two groups, one of said groups is aligned along a front side line being parallel to a longitudinal direction of said twisting apparatus, the other of said groups is aligned along a rear side line being parallel to said front side line, the angle $\alpha$ between said front side line or said rear side line and a line passing through the axial centers of the nearest two two-for-one twisting assemblies selected from said front side line and said rear side line, respectively, being within a range between 60° and 90°.

13. A multiple twisting apparatus according to claim 1, wherein an angle $\theta$ between the upright direction and a spindle axis of each of said two-for-one twisting assemblies being mounted on a bracket of said twisting apparatus is in the range of 0 to 90 degrees.

14. A multiple twisting apparatus according to claim 1, further comprising a second means for controlling yarn tension located between a delivery position of each of[,] said two-for-one twisting assemblies and said means for doubling, and a third means for controlling yarn tension located between said means for doubling and said means for feeding.

15. A multiple twisting apparatus according to claim 12, wherein said twisting units are disposed on both sides of said apparatus.

16. A multiple twisting apparatus according to claim 9, wherein each of said first twisting devices [comprised] *comprises* a clutch means for simultaneously engaging or disengaging each of said first twisting devices to and from said endless belt of said first belt-drive system independently from other first twisting devices.

17. A multiple twisting apparatus according to claim 14, wherein said third means for controlling yarn tension has a capability to reserve an excess length of yarn in a slackened condition which is created at a time of stopping the twisting operation.

18. A multiple twisting apparatus according to claim 14, wherein said second means for controlling yarn tension comprises a yarn tension detector and a limit switch connected to an actuating mechanism of said driving means, whereby said limit switch is actuated to stop said driving means when said yarn tension detector detects a definite lowered condition of yarn tension.

19. A multiple twisting apparatus according to claim 13, wherein said range is from 0° to 45°.

*20. A multiple twisting apparatus as defined in claim 1 wherein said doubled yarn comprises a strand.*

*21. A multiple twisting apparatus as defined in claim 1 wherein said doubled yarn comprises a pair of first twisted yarns disposed in close proximity with each other.*

*22. A multiple twisting apparatus as defined in claim 14 wherein said doubling means, said plurality of yarn guides, and said means for positively feeding said doubled yarn, together, define a common carrying passage for said doubled yarn.*

*23. A multiple twisting apparatus as defined in claim 20 or 21 further comprising a plurality of two-for-one twisting assemblies disposed in adjacent pairs along the lengthwise direction of said apparatus, one member of each said pair being disposed along a forward line extending in the lengthwise direction of said apparatus and the other member of each said pair being disposed behind said one member and along a rearward lengthwise line parallel to said forward line, a plurality of said second twisting devices being disposed along the lengthwise direction of said apparatus, wherein said means for doubling first-twisted yarns comprise a plurality of doubling yarn guides, each said doubling yarn guide being located above one of said pairs of two-for-one twisting assemblies, the lengthwise distance between adjacent second twisting devices being approximately equal to the lengthwise distance between adjacent yarn guides.*

*24. A multiple twisting apparatus as defined in claim 23 wherein said pair of two-for-one twisters is inclined at an angle of from 0° to 90° to the upright direction.*

*25. A multiple twisting apparatus as defined in claim 24 wherein said angle is approximately 10°.*

*26. A multiple twisting apparatus as defined in claim 20 or 21 wherein each said second twisting device is in substantial coaxial alignment with one of said two-for-one twisters.*

*27. A multiple twisting apparatus as defined in claims 20 or 21 wherein a pair of two-for-one twisters are provided, one two-for-one twister of said pair being disposed in front of the other and along a line extending in the lengthwise direction of said apparatus, said second twisting device being in substantial coaxial alignment with said one two-for-one twister.*

*28. A multiple twisting apparatus as defined in claim 27 wherein a line passing through the axial centers of each member of said pair of two-for-one twisters is generally perpendicularly related to the longitudinal direction of said multiple twisting apparatus.*

*29. A multiple twisting apparatus as defined in claims 20 or 21 wherein said means for doubling first-twisted yarns withdrawn from said two-for-one twisting assemblies is positioned above said two-for-one twisting assemblies.*

*30. A multiple twisting apparatus as defined in claim 29 wherein at least a pair of two-for-one twisters are provided, one two-for-one twister of said pair being disposed in front of the other and along a frontal line extending in a lengthwise direction of said apparatus, said second two-for-one twister being disposed along a rearward line parallel to said frontal line, and wherein said mean for doubling first-twisted yarns is located equidistantly from each of said two-for-one twisters in said pair.*

*31. A multiple twisting apparatus as defined in claim 29 wherein said means for doubling is also disposed in front of said plurality of yarn guides and adapted to provide an initial path for said first-twisted yarns withdrawn from said two-for-one twisting assemblies which extends upwardly from said two-for-one twisting assemblies then rearwardly to said plurality of yarn guides.*

*32. A multiple twisting apparatus as defined in claim 31 wherein said means for positively feeding said doubled yarn to said second twisting device is positioned in front of said plurality of yarn guides, said means for doubling, said plurality of yarn guides, and said means for positively feeding said doubled yarn, together, defining an overall yarn path for said yarn which overall yarn path first extends upwardly from said two-for-one twisting assemblies to said doubling means, and rearwardly from said doubling means to said plurality of yarn guides and thus behind said two-for-one twisting assemblies, then forwardly from said plurality of yarn guides to said means for positively feeding said doubled yarn.*

*33. A multiple twisting apparatus as defined in claim 32 wherein said yarn passage behind said two-for-one twisting assemblies defines a line which is generally perpendicular to a line defined by that portion of said overall yarn passage which extends forwardly from said plurality of yarn guides to said means for positively feeding said doubled yarn.*

*34. A multiple twisting apparatus as defined in claim 31 wherein said yarn passage behind said two-for-one twisting assemblies defines a line which is generally perpendicularly related to a line defined by that portion of said overall yarn passage which extends rearwardly from said doubling means to said plurality of yarn guides.*

*35. A multiple twisting apparatus as defined in claim 33 wherein said line defined by that portion of said overall yarn passage which extends forwardly from said plurality of yarn guides to said means for positively feeding said doubled yarn is substantially perpendicularly related to the lengthwise direction of said apparatus.*

*36. A multiple twisting apparatus as defined in claim 34 wherein said line defined by that portion of said overall yarn passage which extends rearwardly from said doubling means to said plurality of yarn guides is substantially perpendicularly related to the lengthwise direction of said apparatus.*

*37. A multiple twisting apparatus as defined in claims 20 or 21 wherein said first tension control means is adapted to control tension within the range of 0.005 grams/denier-0.050 grams/denier.*

*38. A multiple twisting apparatus as defined in claim 14 wherein said second means for controlling yarn tension comprises a tension spring and a yarn feeler adapted to pass underneath said yarn and being connected to said tension spring so as to be biased upwardly thereby.*

*39. A multiple twisting apparatus as defined in claim 14 wherein said third means for controlling yarn tension comprises, a pair of rotatable guide rollers, a tension spring, and a rotatable intermediate guide roller located intermediate said pair of rotatable guide rollers and connected to said tension spring so as to be biased thereby.*

*40. A multiple twisting apparatus as defined in claim 14 wherein said third means for controlling yarn tension comprises a rod pivotally mounted to said apparatus at a pivot point, and a weight mounted on one end of said rod to bias the opposite rod end upwardly, said opposite rod end being adapted to contact said yarn from the underside thereof.*

*41. A multiple twisting apparatus as defined in claim 14 wherein said second tension control means is adapted to control tension within the range of 0.035 grams/denier to 0.150 grams/denier.*

*42. A multiple twisting apparatus as defined in claim 14 wherein said third tension control means is adapted to control tension within the range of 0.070 grams/denier to 0.200 grams/denier.*

*43. A multiple twisting apparatus as defined in claims 20 or 21, further comprising a second means for controlling yarn tension located between the delivery position of each of said two-for-one twisting assemblies and said means for doubling, and a third means for controlling yarn tension located between said means for doubling and said means for feeding, and wherein said third tension means is adapted to control tension ($T_3$)* in such manner so as to be greater than the tension between said delivery position of each of said two-for-one twisting assemblies and said means for doubling ($T_2$), and wherein said second tension means is adapted to control tension ($T_2$) in such manner as to be greater than the tension ($T_1$) within said two-for-one twisting assemblies which tension ($T_1$) is controlled by said first tension means.

*44. A multiple twisting apparatus as defined in claims 20 or 21 wherein the axes of said two-for-one twisting assemblies of said first twisting device and the axis of said second twisting device are substantially located on a same plane, said means for doubling, said plurality of yarn guides, and said means for positively feeding said doubled yarn, together, defining an overall yarn path for said yarn which overall yarn path first extends upwardly from said two-for-one twisting assemblies to said doubling means, and rearwardly from said doubling means to said plurality of yarn guides and thus behind said two-for-one twisting assemblies, then forwardly from said plurality of yarn guides to said means for positively feeding said doubled yarn and said overall yarn path for said yarn is substantially located in said plane.*

*45. A multiple twisting apparatus as defined in claim 44 wherein said plane is generally perpendicularly related to the longitudinal direction of said multiple twisting apparatus.*

* * * * *